(12) United States Patent
Stratakos et al.

(10) Patent No.: US 8,350,658 B1
(45) Date of Patent: Jan. 8, 2013

(54) METHOD FOR MAKING MAGNETIC COMPONENTS WITH N-PHASE COUPLING, AND RELATED INDUCTOR STRUCTURES

(75) Inventors: Anthony Stratakos, Berkeley, CA (US); Charles R. Sullivan, West Lebanon, NH (US); Jieli Li, Fremont, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 12/987,944

(22) Filed: Jan. 10, 2011

Related U.S. Application Data

(60) Continuation of application No. 12/392,602, filed on Feb. 25, 2009, now Pat. No. 7,898,379, which is a continuation-in-part of application No. 12/344,163, filed on Dec. 24, 2008, now Pat. No. 7,893,806, which is a continuation of application No. 11/929,827, filed on Oct. 30, 2007, now Pat. No. 7,498,920, which is a continuation-in-part of application No. 11/852,207, filed on Sep. 7, 2007, now abandoned, which is a division of application No. 10/318,896, filed on Dec. 13, 2002, now Pat. No. 7,352,269.

(51) Int. Cl.
*H01F 27/24* (2006.01)
(52) U.S. Cl. ....................................... 336/212
(58) Field of Classification Search ............ 336/65, 336/83, 212, 200, 232, 170, 173, 214–215; 257/531
See application file for complete search history.

(56) References Cited

U.S. PATENT DOCUMENTS

| | | | |
|---|---|---|---|
| 2,212,543 | A | 8/1940 | Jovy |
| 3,185,947 | A | 5/1965 | Freymodsson |
| 3,878,495 | A | 4/1975 | Thomas |
| 3,988,665 | A | 10/1976 | Neumaier et al. |
| 4,455,545 | A | 6/1984 | Shelly |
| 4,488,136 | A | 12/1984 | Hansen et al. |
| 4,531,085 | A | 7/1985 | Mesenhimer |
| 4,636,752 | A | 1/1987 | Saito |
| 4,777,406 | A | 10/1988 | Ross et al. |
| 4,800,479 | A | 1/1989 | Bupp |
| 5,003,277 | A | 3/1991 | Sokai et al. |

(Continued)

FOREIGN PATENT DOCUMENTS

DE 922 423 1/1955

(Continued)

OTHER PUBLICATIONS

U.S. Appl. No. 12/271,497, Notice of Allowance dated Mar. 9, 2011, 5 pages.

(Continued)

*Primary Examiner* — Tuyen Nguyen
(74) *Attorney, Agent, or Firm* — Lathrop & Gage LLP

(57) ABSTRACT

Methods and structures for constructing a magnetic core of a coupled inductor. The method provides for constructing N-phase coupled inductors as both single and scalable magnetic structures, where N is an integer greater than 1. The method additionally describes how such a construction of the magnetic core may enhance the benefits of using the scalable N-phase coupled inductor. The first and second magnetic cores may be formed into shapes that, when coupled together, may form a single scalable magnetic core. For example, the cores can be fashioned into shapes such as a U, an I, an H, a ring, a rectangle, and a comb, that cooperatively form the single magnetic core.

5 Claims, 19 Drawing Sheets

U.S. PATENT DOCUMENTS

| | | | |
|---|---|---|---|
| 5,123,989 | A | 6/1992 | Horiishi et al. |
| 5,161,098 | A | 11/1992 | Balakrishnan |
| 5,177,460 | A | 1/1993 | Dhyanchand et al. |
| 5,182,535 | A | 1/1993 | Dhyanchand |
| 5,204,809 | A | 4/1993 | Andresen |
| 5,225,971 | A | 7/1993 | Spreen |
| 5,353,001 | A * | 10/1994 | Meinel et al. ............... 336/83 |
| 5,436,818 | A | 7/1995 | Barthold |
| 5,469,334 | A | 11/1995 | Balakrishnan |
| 5,565,837 | A | 10/1996 | Godek et al. |
| 5,568,111 | A | 10/1996 | Metsler |
| 5,574,420 | A | 11/1996 | Roy et al. |
| 5,594,402 | A | 1/1997 | Kritchafovitch et al. |
| 5,631,822 | A | 5/1997 | Silberkleit et al. |
| 5,764,500 | A | 6/1998 | Matos |
| 5,939,966 | A | 8/1999 | Shin'Ei |
| 6,018,468 | A | 1/2000 | Archer et al. |
| 6,060,977 | A * | 5/2000 | Yamamoto et al. ........ 336/212 |
| 6,342,778 | B1 | 1/2002 | Catalano et al. |
| 6,348,848 | B1 | 2/2002 | Herbert |
| 6,356,179 | B1 | 3/2002 | Yamada |
| 6,362,986 | B1 | 3/2002 | Schultz et al. |
| 6,377,155 | B1 * | 4/2002 | Allen et al. ............... 336/200 |
| 6,420,953 | B1 | 7/2002 | Dadafshar |
| 6,477,414 | B1 * | 11/2002 | Silvian ............... 607/5 |
| 6,549,111 | B1 | 4/2003 | De Graaf et al. |
| 6,578,253 | B1 | 6/2003 | Herbert |
| 6,714,428 | B2 | 3/2004 | Huang et al. |
| 6,737,951 | B1 | 5/2004 | Decristofaro et al. |
| 6,774,758 | B2 | 8/2004 | Gokhale et al. |
| 6,784,644 | B2 | 8/2004 | Xu et al. |
| 6,867,678 | B2 | 3/2005 | Yang |
| 6,903,648 | B2 | 6/2005 | Baumann et al. |
| 6,922,883 | B2 | 8/2005 | Gokhale et al. |
| 6,965,290 | B2 | 11/2005 | Gokhale et al. |
| 6,980,077 | B1 | 12/2005 | Chandrasekaran et al. |
| 7,187,263 | B2 | 3/2007 | Vinciarelli |
| 7,199,695 | B1 | 4/2007 | Zhou et al. |
| 7,233,132 | B1 | 6/2007 | Dong et al. |
| 7,248,139 | B1 | 7/2007 | Podlisk et al. |
| 7,280,025 | B2 | 10/2007 | Sano |
| 7,310,039 | B1 | 12/2007 | Zhang |
| 7,352,269 | B2 | 4/2008 | Li et al. |
| 7,498,920 | B2 | 3/2009 | Sullivan et al. |
| 7,525,406 | B1 | 4/2009 | Cheng |
| 7,525,408 | B1 | 4/2009 | Li et al. |
| 7,567,163 | B2 | 7/2009 | Dadafshar et al. |
| 7,994,888 | B2 | 8/2011 | Ikriannikov |
| 2002/0067234 | A1 | 6/2002 | Kung |
| 2004/0017276 | A1 | 1/2004 | Chen et al. |
| 2004/0085173 | A1 | 5/2004 | Decristofaro et al. |
| 2005/0024179 | A1 | 2/2005 | Chandrasekaran et al. |
| 2006/0158297 | A1 | 7/2006 | Sutardja |
| 2006/0197510 | A1 | 9/2006 | Chandrasekaran |
| 2007/0175701 | A1 | 8/2007 | Xu et al. |
| 2007/0176726 | A1 | 8/2007 | Xu et al. |
| 2008/0024259 | A1 | 1/2008 | Chandrasekaran et al. |
| 2008/0150666 | A1 | 6/2008 | Chandrasekaran et al. |
| 2008/0205098 | A1 | 8/2008 | Xu et al. |
| 2009/0231081 | A1 | 9/2009 | Ikriannikov |

FOREIGN PATENT DOCUMENTS

| | | |
|---|---|---|
| DE | 26 53 568 | 6/1978 |
| DE | 3123006 | 1/1983 |
| DE | 37 03 561 | 8/1988 |
| DE | 101 05 087 | 8/2001 |
| DE | 10 2006 034553 | 6/2007 |
| EP | 0 012 629 | 6/1980 |
| EP | 0 225 830 | 6/1987 |
| EP | 0 577 334 | 1/1994 |
| EP | 0 755 060 | 1/1997 |
| EP | 1 519 392 | 3/2005 |
| EP | 1 519 473 | 3/2005 |
| EP | 1 835 604 | 9/2007 |
| JP | 60-015908 | 1/1985 |
| JP | 11 144983 | 5/1999 |
| JP | 11 307369 | 11/1999 |
| JP | 2002057049 | 2/2002 |
| WO | WO 2006/026674 | 3/2006 |
| WO | WO 2006/109329 | 10/2006 |
| WO | WO 2009/059069 | 5/2009 |

OTHER PUBLICATIONS

U.S. Appl. No. 12/271,497, Issue Fee Payment filed May 13, 2011, 1 pages.

Chandrasekaran, S. et al., "Integrated Magnetics for Interleaved DC-DC Boost for Fuel Cell Powered Vehicles," 35th Annual IEEE Power Electronics Specialists Conferences, 356-61 (2004).

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

U.S. Appl. No. 11/929,827, Restriction Requirement mailed Aug. 18, 2008, 7 pages.

U.S. Appl. No. 11/929,827, Response to Restriction Requirement filed Sep. 4, 2008, 3 pages.

U.S. Appl. No. 11/929,827, Notice of Allowance mailed Oct. 21, 2008, 7 pages.

U.S. Appl. No. 11/929,827, Issue Fee Payment and Comments on Statement of Reasons for Allowance, Jan. 21, 2009, 2 pages.

U.S. Appl. No. 11/852,207, Restriction Requirement mailed Feb. 26, 2008, 7 pages.

U.S. Appl. No. 11/852,207, Response to Restriction Requirement filed Mar. 26, 2008, 3 pages.

U.S. Appl. No. 11/852,207, Office Action mailed Jun. 20, 2008, 7 pages.

U.S. Appl. No. 11/852,207, Notice of Abandonment mailed Dec. 23, 2008, 2 pages.

U.S. Appl. No. 10/318,896, Issue Fee Payment, Jan. 4, 2008, 1 page.

U.S. Appl. No. 10/318,896, Supplemental Notice of Allowance, Dec. 13, 2007, 2 pages.

U.S. Appl. No. 10/318,896; Notice of Allowance, Oct. 4, 2007, 4 pages.

U.S. Appl. No. 10/318,896, Sixth Request for Acknowledgement of an Information Disclosure Statement, Jan. 4, 2008, 6 pages.

U.S. Appl. No. 10/318,896; Statement of the Substance of Interview, Sep. 27, 2007, 2 pages.

U.S. Appl. No. 10/318,896, Supplemental Amendment filed Sep. 14, 2007, 12 pages.

U.S. Appl. No. 10/318,896, Response to Office Action mailed Jan. 18, 2007 and RCE; filed Jul. 18, 2007, 46 pages.

U.S. Appl. No. 10/318,896, Statement of the Substance of Interview; filed Apr. 23, 2007, 2 pages.

U.S. Appl. No. 10/318,896, Office Action mailed Jan. 18, 2007, 8 pages.

U.S. Appl. No. 10/318,896, Petition to Review Restriction Requirement, filed Aug. 24, 2006, 89 pages.

U.S. Appl. No. 10/318,896, Response to Office Action mailed Jun. 30, 2006; filed Oct. 25, 2006, 26 pages.

U.S. Appl. No. 10/318,896, Office Action mailed Jun. 30, 2006, 6 pages.

U.S. Appl. No. 10/318,896, Response to Office Action mailed Dec. 2, 2005; filed Mar. 24, 2006, 23 pages.

U.S. Appl. No. 10/318,896, Office Action mailed Dec. 2, 2005, 7 pages.

U.S. Appl. No. 10/318,896, Response to Office Action mailed Jun. 14, 2005; filed Sep. 14, 2005, 30 pages.

U.S. Appl. No. 10/318,896, Office Action mailed Jun. 14, 2005, 9 pages.

U.S. Appl. No. 10/318,896, Response to Office Action mailed Jun. 15, 2004; filed Aug. 16, 2004; 13 pages.

U.S. Appl. No. 10/318,896, Office Action mailed Jun. 15, 2004, 6 pages.

U.S. Appl. No. 10/318,896, Response to Office Action mailed Dec. 6, 2004; filed Feb. 7, 2005, 12 pages.

U.S. Appl. No. 10/318,896, Office Action mailed Dec. 6, 2004, 5 pages.

U.S. Appl. No. 11/852,231, Notice of Noncompliant Response dated Apr. 29, 2009, 3 pages.
U.S. Appl. No. 11/852,231, Response to Restriction Requirement, filed Jan. 9, 2009; 3 pages.
U.S. Appl. No. 11/852,231, Restriction Requirement mailed Dec. 11, 2008; 8 pages.
U.S. Appl. No. 11/852,231, Response to Restriction Requirement, filed Sep. 2, 2008, 3 pages.
U.S. Appl. No. 11/852,231, Applicant Interview Summary, Aug. 29, 2008, 2 pages.
U.S. Appl. No. 11/852,231, Examiner Interview Summary mailed Aug. 6, 2008, 2 pages.
U.S. Appl. No. 11/852,231, Restriction Requirement mailed Feb. 26, 2008, 7 pages.
U.S. Appl. No. 11/852,231, Response to Restriction Requirement filed Mar. 26, 2008, 3 pages.
U.S. Appl. No. 11/852,231, Notice of Noncompliant Amendment mailed Jul. 2, 2008, 3 pages.
U.S. Appl. No. 11/852,216, Response to Restriction Requirement filed Jan. 22, 2009, 3 pages.
U.S. Appl. No. 11/852,216, Restriction Requirement mailed Dec. 22, 2008, 7 pages.
U.S. Appl. No. 11/852,216, Response to Restriction Requirement filed Mar. 26, 2008, 3 pages.
U.S. Appl. No. 11/852,216, Restriction Requirement mailed Feb. 26, 2008, 7 pages.
U.S. Appl. No. 11/852,216, Notice of Noncompliant Amendment mailed Jul. 7, 2008, 3 pages.
U.S. Appl. No. 11/852,216, Response to Restriction Requirement filed Sep. 4, 2008, 3 pages.
U.S. Appl. No. 11/852,226, Issue Fee Payment and Comments on Statement of Reasons for Allowance, Mar. 18, 2009, 2 pages.
U.S. Appl. No. 11/852,226, Notice of Allowance mailed Dec. 18, 2008, 8 pages.
U.S. Appl. No. 11/852,226, Response to Restriction Requirement filed Mar. 26, 2008, 7 pages.
U.S. Appl. No. 11/852,226, Restriction Requirement mailed Feb. 25, 2008, 7 pages.
U.S. Appl. No. 11/852,216, Notice re Non-Compliant Amendment mailed May 14, 2009, 3 pages.
U.S. Appl. No. 11/852,216, Response to Election/Restriction filed Jul. 14, 2009, 4 pages.
U.S. Appl. No. 11/852,216, Requirement for Restriction/Election mailed Oct. 19, 2009, 6 pages.
U.S. Appl. No. 11/852,231, Response to Election/Restriction filed Jun. 30, 2009, 7 pages.
U.S. Appl. No. 11/852,231, Non-final rejection mailed Oct. 6, 2009, 7 pages.
U.S. Appl. No. 12/202,929, Requirement for Election/Restriction mailed Jun. 11, 2009, 7 pages.
U.S. Appl. No. 12/202,929, Response to Election/Restriction filed Jul. 10, 2009, 3 pages.
U.S. Appl. No. 12/271,497, Requirement for Restriction/Election mailed Jun. 11, 2009, 7 pages.
U.S. Appl. No. 12/271,497, Response to Election/Restriction filed Aug. 11, 2009, 4 pages.
PCT/US08/81886, International Search Report and Written Opinion mailed Jun. 23, 2009, 21 pages.
PCT/US09/37320, International Search Report and Written Opinion mailed Jun. 20, 2009, 19 pages.
U.S. Appl. No. 11/852,216, Response to Restriction Requirement filed Nov. 17, 2009, 3 pages.
U.S. Appl. No. 12/202,929, Notice of Allowance mailed Dec. 24, 2009, 8 pages.
U.S. Appl. No. 12/271,497, Non-final Rejection mailed Dec. 14, 2009, 7 pages.
U.S. Appl. No. 12/344,163, Restriction Requirement mailed Dec. 11, 2009, 6 pages.
U.S. Appl. No. 12/344,163, Response to Restriction Requirement filed Jan. 11, 2010, 4 pages.
U.S. Appl. No. 11/852,231, Notice of Allowance mailed Mar. 26, 2010, 6 pages.
U.S. Appl. No. 11/852,231, Response to Office Action filed Jan. 28, 2010, 17 pages.
U.S. Appl. No. 12/344,163, Office Action mailed Mar. 22, 2010, 6 pages.
U.S. Appl. No. 12/202,929, Issue Fee payment, Request for Acknowledgement of an IDS and Comments on Statement of Reasons for Allowance filed Feb. 11, 2010, 8 pages.
U.S. Appl. No. 12/271,497, Response to Office Action filed Mar. 12, 2010, 11 pages.
U.S. Appl. No. 11/852,216, Office Action mailed Aug. 5, 2010, 6 pages.
U.S. Appl. No. 11/852,216, Response to Office Action filed Sep. 3, 2010, 3 pages.
U.S. Appl. No. 11/852,231, Issue Fee Payment filed Jun. 28, 2010, 1 page.
U.S. Appl. No. 12/271,497, Office Action mailed Jun. 25, 2010, 7 pages.
U.S. Appl. No. 12/344,163, Response to Office Action filed Sep. 22, 2010, 9 pages.
U.S. Appl. No. 12/392,602, Notice of Allowance mailed Oct. 18, 2010, 4 pages.
U.S. Appl. No. 12/392,602, Response to Office Action filed Oct. 5, 2010, 15 pages.
U.S. Appl. No. 12/392,602, Office Action mailed Apr. 5, 2010, 8 pages.
U.S. Appl. No. 12/344,163, Notice of Allowance mailed Oct. 18, 2010, 4 pages.
U.S. Appl. No. 12/271,497, Notice of Appeal and Pre-Appeal Brief Conference Request, filed Oct. 25, 2010, 8 pages.
U.S. Appl. No. 11/852,216, Issue Fee Payment and Comments on Statement of Reasons for Allowance filed Oct. 13, 2010, 2 pages.
U.S. Appl. No. 11/852,216, Notice of Allowance mailed Oct. 7, 2010, 6 pages.
Dong et al., Twisted Core Coupled Inductors for Microprocessor Voltage Regulators, Power Electronics Specialists Conference, pp. 2386-2392, Jun. 17-21, 2007.
Dong et al., The Short Winding Path Coupled Inductor Voltage Regulators, Applied Power Electronics Conference and Exposition, pp. 1446-1452, Feb. 24-28, 2008.
Dong et al., Evaluation of Coupled Inductor Voltage Regulators, Applied Power Electronics Conference and Exposition, pp. 831-837, Feb. 24-28, 2008.
Vishay, Low Profile, High Current IHLP Inductor, 3 pages, Jan. 21, 2009.
Panasonic, Power Choke Coil, 2 pages, Jan. 2008.
Cooper Bussmann, "Product Data Sheet for Low Profile Inductor (Surface Mount)" retrieved from http://www.angliac.com, May 2003.
Papers received from Santangelo Law Office dated Dec. 22, 2006 and May 30, 2007.
Pulse, SMT Power Inductors datasheet, 2 pages, Nov. 2007.
Wong, Pit-Leong, et al., "Investigating Coupling Inductors in the Interleaving QSW VRM" Applied Power Electronics Conference and Exposition, 2000. APEC 2000. Fifteenth Annual IEEE; Mar. 2000; pp. 973-978.
Wong, Pit-Leong, et al.; A Novel Modeling Concept for Multi-coupling Core Structures; Center for Power Electronics Systems; IEEE.

* cited by examiner

METHOD FOR MAKING MAGNETIC COMPONENTS WITH N-PHASE COUPLING, AND RELATED INDUCTOR STRUCTURES

CROSS-REFERENCE TO RELATED APPLICATIONS

This application is a continuation of U.S. patent application Ser. No. 12/392,602, filed 25 Feb. 2009, now U.S. Pat. No. 7,898,379 which is a continuation-in-part of U.S. patent application Ser. No. 12/344,163, filed 24 Dec. 2008, now U.S. Pat. No. 7,893,806 which is a continuation of U.S. patent application Ser. No. 11/929,827, filed 30 Oct. 2007, now U.S. Pat. No. 7,498,920, which is a continuation-in-part of U.S. patent application Ser. No. 11/852,207, filed 7 Sep. 2007, now abandoned which is a divisional of U.S. patent application Ser. No. 10/318,896, filed 13 Dec. 2002, now U.S. Pat. No. 7,352,269. All of the above-mentioned patent applications are incorporated herein by reference.

BACKGROUND OF THE INVENTION

1. Field of the Invention

The invention relates generally to making DC-to-DC converters. More specifically the invention relates to construction of a coupled inductor within a multi-phase DC-to-DC converter.

2. Background of the Invention

A DC-to-DC converter, as known in the art, provides an output voltage that is a step-up, a step-down, or a polarity reversal of the input voltage source. Certain known DC-to-DC converters have parallel power units with inputs coupled to a common DC voltage source and outputs coupled to a load, such as a microprocessor. Multiple power-units can sometimes reduce cost by lowering the power and size rating of components. A further benefit is that multiple power units provide smaller per-power-unit peak current levels, combined with smaller passive components.

The prior art also includes switching techniques in parallel-power-unit DC-to-DC converters. By way of example, power units may be switched with pulse width modulation (PWM) or with pulse frequency modulation (PFM). Typically, in a parallel-unit buck converter, the energizing and de-energizing of the inductance in each power unit occurs out of phase with switches coupled to the input, inductor and ground. Additional performance benefits are provided when the switches of one power unit, coupling the inductors to the DC input voltage or to ground, operate out of phase with respect to the switches in another power unit. Such a "multi-phase," parallel power unit technique results in a higher effective frequency of ripple current which is easier to filter with a capacitor, to which all the inductors are coupled at their respective output terminals.

It is clear that smaller inductances are needed in DC-to-DC converters to support the response time required in load transients and without prohibitively costly output capacitance. More particularly, the capacitance requirements for systems with fast loads, and large inductors, may make it impossible to provide adequate capacitance configurations, in part due to the parasitic inductance of a large physical layout. But smaller inductors create other issues, such as the higher frequencies used in bounding the AC peak-to-peak current ripple within each power unit. Higher frequencies and smaller inductances enable shrinking of part size and weight. However, higher switching frequencies result in more heat dissipation and lower efficiency. In short, small inductance is good for transient response, but large inductance is good for AC current ripple reduction and efficiency.

The prior art has sought to reduce the current ripple in multiphase switching topologies by coupling inductors. For example, one system set forth in U.S. Pat. No. 5,204,809, incorporated herein by reference, couples two inductors in a dual-phase system driven by an H bridge to help reduce ripple current. In one article, Investigating Coupling Inductors in the Interleaving QSW VRM, IEEE APEC (Wong, February 2000), slight benefit is shown in ripple reduction by coupling two windings using presently available magnetic core shapes. However, the benefit from this method is limited in that it only offers slight reduction in ripple at some duty cycles for limited amounts of coupling.

One known DC-to-DC converter offers improved ripple reduction that either reduces or eliminates the afore-mentioned difficulties. Such a DC-to-DC converter is described in commonly owned U.S. Pat. No. 6,362,986 issued to Schultz et al., incorporated herein by reference. The '986 patent can improve converter efficiency and reduce the cost of manufacturing DC-to-DC converters.

Specifically, the '986 patent shows one system that reduces the ripple of the inductor current in a two-phase coupled inductor within a DC-to-DC buck converter. The '986 patent also provides a multi-phase transformer model to illustrate the working principles of multi-phase coupled inductors. It is a continuing problem to address scalability and implementation issues DC-to-DC converters.

As circuit components and, thus, printed circuit boards (PCB), become smaller due to technology advancements, smaller and more scalable DC-to-DC converters are needed to provide for a variety of voltage conversion needs. One specific feature presented hereinafter is to provide a DC-to-DC converter, the DC-to-DC converter being scalable in some embodiments. Another feature is to provide a converter that is mountable to a PCB. Yet another feature is to provide a lower cost manufacturing methodology for DC-to-DC converters, as compared to the prior art. These and other features will be apparent in the description that follows.

SUMMARY OF THE INVENTION

As used herein, a "coupled" inductor implies a magnetic interaction between at least one inductor of each of several different phases. Coupled inductors described herein may be used within DC-to-DC converters or within a power converter for power conversion applications, for example.

A method of one aspect provides for constructing a magnetic core. Such a core is, for example, useful in applications detailed in the '986 patent. In one aspect, the method provides for constructing N-phase coupled inductors as both single and scalable magnetic structures, where N is greater than 1. An N-phase inductor as described herein may include N-number of windings. One method additionally describes construction of a magnetic core that enhances the benefits of using the scalable N-phase coupled inductor.

In one aspect, the N-phase coupled inductor is formed by coupling first and second magnetic cores in such a way that a planar surface of the first core is substantially aligned with a planar surface of the second core in a common plane. The first and second magnetic cores may be formed into shapes that, when coupled together, may form a single scalable magnetic core having desirable characteristics, such as ripple current reduction and ease of implementation. In one example, the cores are fashioned into shapes, such as a U-shape, an I-shape (e.g., a bar), an H-shape, a ring-shape, a rectangular-shape, or a comb. In another example, the cores could be fashioned into a printed circuit trace within a PCB.

In another aspect, certain cores form passageways through which conductive windings are wound when coupled together. Other cores may already form these passageways (e.g., the ring-shaped core and the rectangularly shaped core). For example, two H-shaped magnetic cores may be coupled at the legs of each magnetic core to form a passageway. As another example, a multi-leg core may be formed as a comb-shaped core coupled to an I-shaped core. In yet another example, two I-shaped cores are layered about a PCB such that passageways are formed when the two cores are coupled to one another at two or more places, or when pre-configured holes in the PCB are filled with a ferromagnetic powder.

Advantages of the method and structures herein include a scalable and cost effective DC-to-DC converter that reduces or nearly eliminates ripple current. The methods and structures further techniques that achieve the benefit of various performance characteristics with a single, scalable, topology.

DETAILED DESCRIPTION OF THE DRAWINGS

Figure 1:
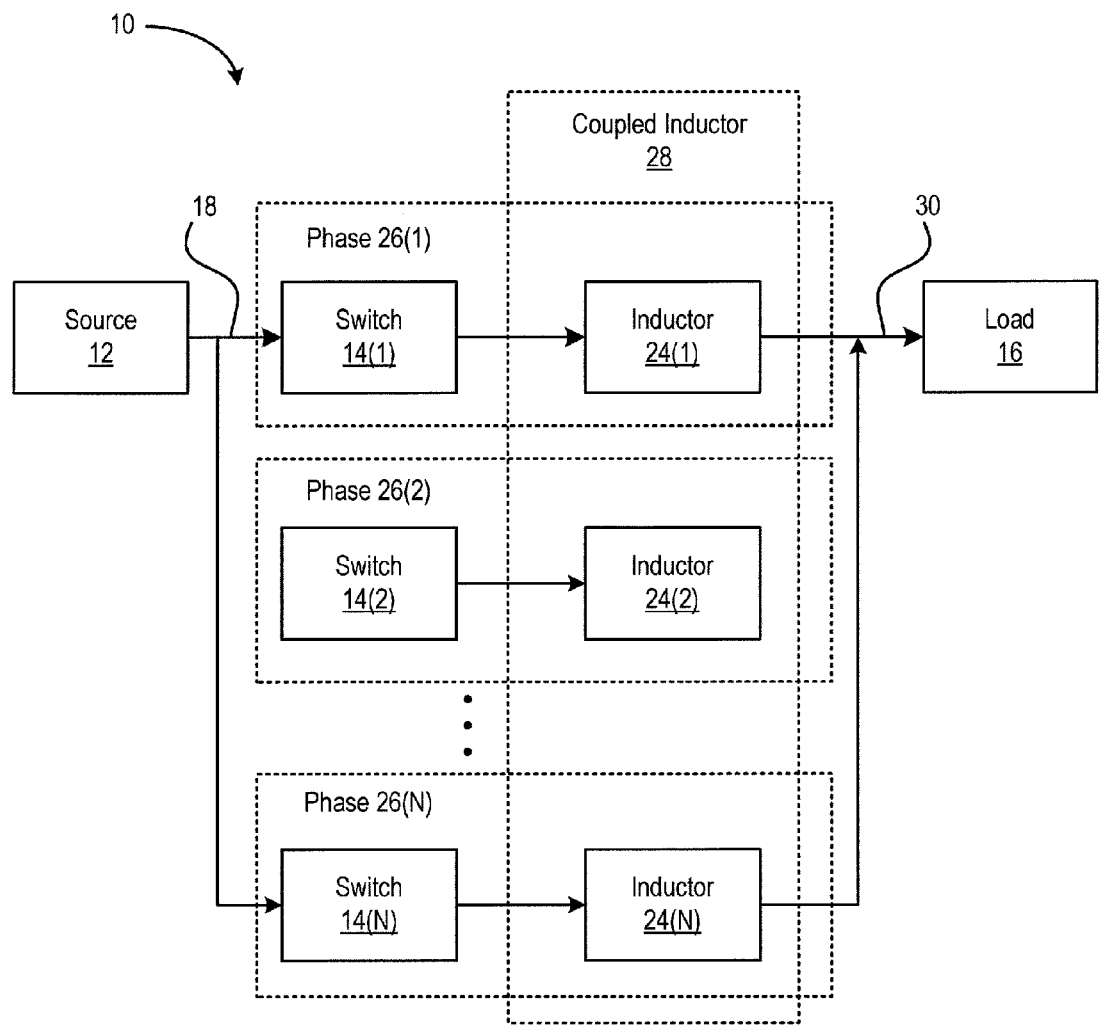
FIG. 1 shows one multi-phase DC-to-DC converter system.

It is noted that, for purposes of illustrative clarity, certain elements in the drawings may not be drawn to scale. Specific instances of an item may be referred to by use of a reference numeral in parentheses (e.g., winding 506(1)) while reference numerals without parentheses refer to any such item (e.g., windings 506).

FIG. 1 shows a multi-phase DC-to-DC converter system 10. System 10 includes a power source 12 electrically coupled with N switches 14 and N inductors 24, with N=2, for supplying power to a load 16. Each switch and inductor pair 14, 24 represent one phase 26 of system 10, as shown. Inductors 24 cooperate together as a coupled inductor 28. Each inductor 24 has, for example, a leakage inductance value within the range of 10 nanohenrys ("nH") to 200 nH; such exemplary leakage inductance values may enable system 10 to advantageously have a relatively low ripple voltage magnitude and an acceptable transient response at a typical switching frequency. Power source 12 may, for example, be either a DC power source, such as a battery, or an AC power source cooperatively coupled to a rectifier, such as a bridge rectifier, to provide DC power in signal 18. Each switch 14 may include a plurality of switches to perform the functions of DC-to-DC converter system 10.

In operation, DC-to-DC converter system 10 converts an input signal 18 from source 12 to an output signal 30. The voltage of signal 30 may be controlled through operation of switches 14, to be equal to or different from signal 18. Specifically, coupled inductor 28 has one or more windings (not shown) that extend through and about inductors 24, as described in detail below. These windings attach to switches 14, which collectively operate to regulate the output voltage of signal 30 by sequentially switching inductors 24 to signal 18.

When N=2, system 10 may for example be used as a two-phase power converter, (e.g., power supply). System 10 may also be used in both DC and AC based power supplies to replace a plurality of individual discrete inductors such that coupled inductor 28 reduces inductor ripple current, filter capacitances, and/or PCB footprint sizes, while delivering higher system efficiency and enhanced system reliability. Other functional and operational aspects of DC-to-DC converter system 10 may be exemplarily described in the '986 patent, features of coupled inductor 28 are described in detail below in connection with FIG. 2-FIG. 17. Those skilled in the art appreciate that system 10 may be arranged with different topologies to provide a coupled inductor 28 and without departing from the scope hereof.

Figure 2:
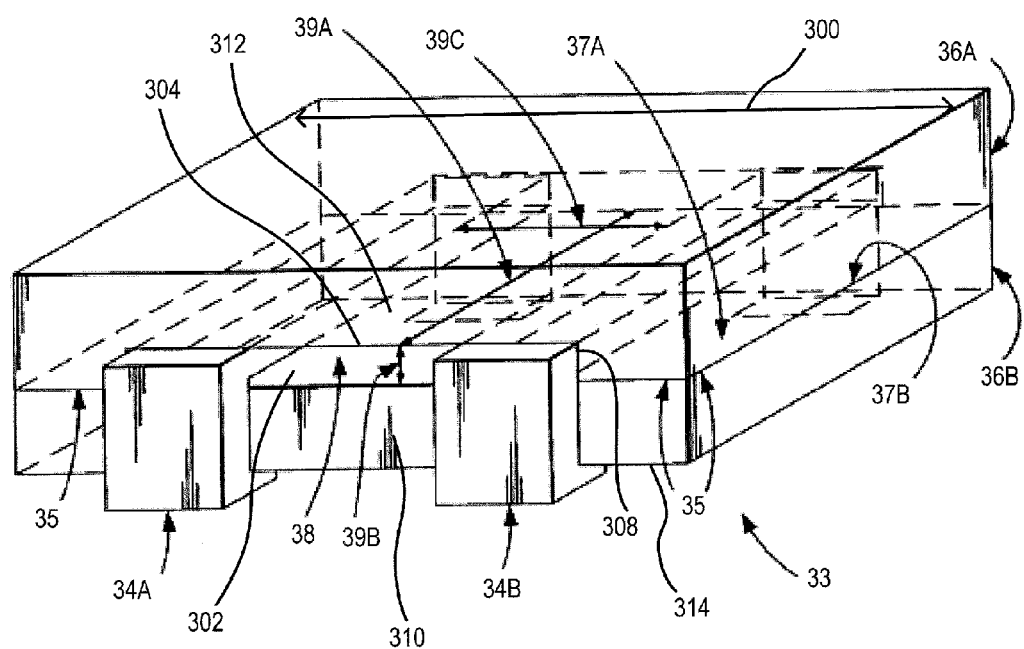
FIG. 2 shows one two-phase coupled inductor.

FIG. 2 shows a two-phase coupled inductor 33, in accord with one embodiment. Inductor 33 may, for example, serve as inductor 28 of FIG. 1, with N=2. The two-phase coupled inductor 33 may include a first magnetic core 36A and a second magnetic core 36B. The first and second magnetic cores 36A, 36B, respectively, are coupled together such that planar surfaces 37A, 37B, respectively, of each core are substantially aligned in a common plane, represented by line 35. When the two magnetic cores 36A and 36B are coupled together, they cooperatively form a single magnetic core for use as a two-phase coupled inductor 33.

In this embodiment, the first magnetic core 36A may be formed from a ferromagnetic material into a U-shape. The second magnetic core 36B may be formed from the same ferromagnetic material into a bar, or I-shape, as shown. As the two magnetic cores 36A, 36B are coupled together, they form a passageway 38 through which windings 34A, 34B are wound. The windings 34A, 34B may be formed of a conductive material, such as copper, that winds though and about the passageway 38 and the magnetic core 36B. Moreover, those skilled in the art should appreciate that windings 34A, 34B may include a same or differing number of turns about the magnetic core 36B. Windings 34A, 34B are shown as single turn windings, to decrease resistance through inductor 33.

The windings 34A and 34B of inductor 33 may be wound in the same or different orientation from one another. The windings 34A and 34B may also be either wound about the single magnetic core in the same number of turns or in a different number of turns. The number of turns and orientation of each winding may be selected so as to support the functionality of the '986 patent, for example. By orienting the windings 34A and 34B in the same direction, the coupling is directed so as to reduce the ripple current flowing in windings 34A, 34B.

Those skilled in the art should appreciate that a gap (not shown) may exist between magnetic cores 36A, 36B, for example to reduce the sensitivity to direct current when inductor 33 is used within a switching power converter. Such a gap is for example illustratively discussed as dimension A, FIG. 5.

The dimensional distance between windings 34A, 34B may also be adjusted to adjust leakage inductance. Such a dimension is illustratively discussed as dimension E, FIG. 5.

As shown, magnetic core 36A is a "U-shaped" core while magnetic core 36B is an unshaped flat plate. Those skilled in the art should also appreciate that coupled inductor 33 may be formed with magnetic cores with different shapes. By way of example, two "L-shaped" or two "U-shaped" cores may be coupled together to provide like overall form as combined cores 36A, 36B, to provide like functionality within a switching power converter. Cores 36A, 36B may be similarly replaced with a solid magnetic core block with a hole therein to form passageway 38. At least part of passageway 38 is free from intervening magnetic structure between windings 34A, 34B; air or non-magnetic structure may for example fill the space of passageway 38 and between the windings 34A, 34B. In one embodiment, intervening magnetic structure fills no more than 50% of a cross-sectional area between windings 34A, 34B, and within passageway 38; by way of example, the cross-sectional area of passageway 38 may be defined by the plane of dimensions 39A (depth), 39B (height), which is perpendicular to a line 39C (separation distance) between windings 34A, 34B.

FIG. 2 also illustrates one advantageous feature associated with windings 34A, 34B. Specifically, each of windings 34A, 34B is shown with a rectangular cross-section that, when folded underneath core 36B, as shown, produces a tab for soldering to a PCB, and without the need for a separate item. Other windings discussed below may have similar beneficial features.

FIG. 2 also shows planar surfaces 302, 304, 308, and 314, legs or sides 310 and 312, and width 300.

Figure 3:
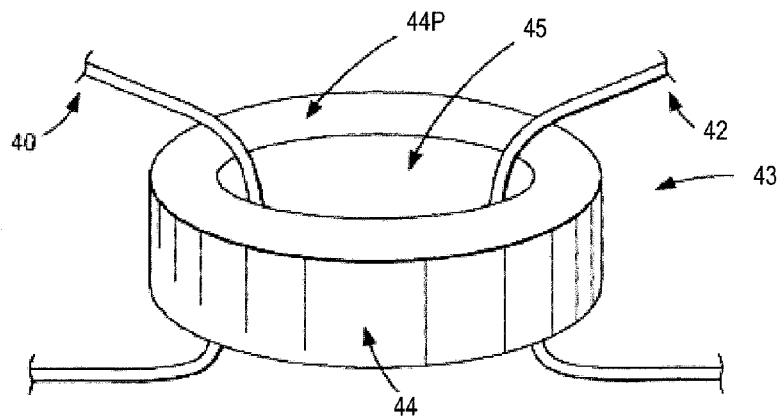
FIG. 3 shows one two-phase coupled ring-core inductor.

FIG. 3 shows a single two-phase ring-core coupled inductor 43, in accord with one embodiment. Inductor 43 may be combined with other embodiments herein, for example, to serve as inductor 28 of FIG. 1. The ring-core inductor 43 is formed from a ring magnetic core 44. The core 44 has a passageway 45; windings 40 and 42 are wound through passageway 45 and about the core 44, as shown. In this embodiment, core 44 is formed as a single magnetic core; however multiple magnetic cores, such as two semi-circles, may be cooperatively combined to form a similar core structure. Other single magnetic core embodiments shown herein may also be formed by cooperatively combining multiple magnetic cores as discussed in FIG. 17. Such a combination may align plane 44P of magnetic core 44 in the same plane of other magnetic cores 44, for example to facilitate mounting to a PCB. At least part of passageway 45 is free from intervening magnetic structure between windings 40, 42; air may for example fill the space of passageway 45 and between windings 40, 42. In one embodiment, intervening magnetic structure fills no more than 50% of a cross-sectional area between windings 40, 42, and within passageway 45.

In one embodiment, windings 40 and 42 wind through passageway 45 and around ring magnetic core 44 such that ring magnetic core 44 and windings 40, 42 cooperate with two phase coupling within a switching power converter. Winding 40 is oriented such that dc current in winding 40 flows in a first direction within passageway 45; winding 42 is oriented such that dc current in winding 42 flows in a second direction within passageway 45, where the first direction is opposite to the second direction. Such a configuration avoids dc saturation of core 44, and effectively reduces ripple current. See U.S. Pat. No. 6,362,986.

Figure 4:
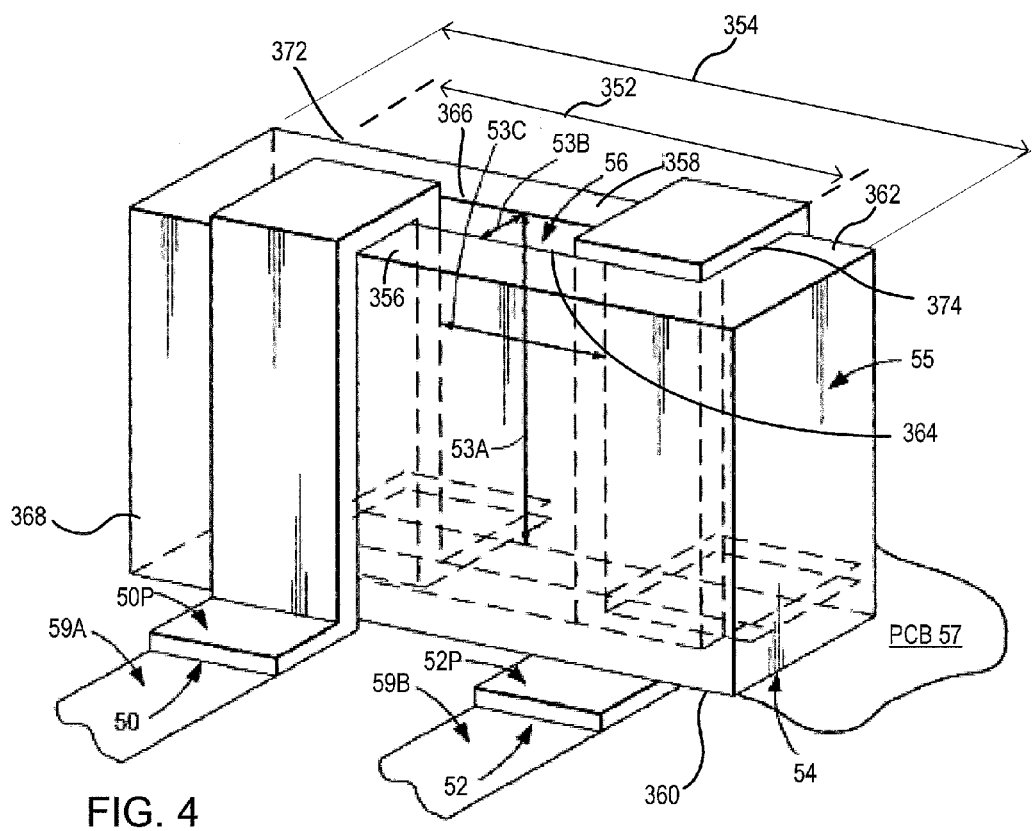
FIG. 4 shows one vertically mounted two-phase coupled inductor.

FIG. 4 shows a vertically mounted two-phase coupled inductor 54, in accord with one embodiment. Inductor 54 may be combined and/or formed with other embodiments herein, for example, to serve as inductor 28 of FIG. 1. The inductor 54 is formed as a rectangular-shaped magnetic core 55. The core 55 forms a passageway 56; windings 50 and 52 may be wound through passageway 56 and about the core 55. In this embodiment, the inductor 54 may be vertically mounted on a plane of PCB 57 (e.g., one end of passageway 56 faces the plane of the PCB 57) so as to minimize a "footprint", or real estate, occupied by the inductor 54 on the PCB 57. This embodiment may improve board layout convenience. Windings 50 and 52 may connect to printed traces 59A, 59B on the PCB 57 for receiving current. Additionally, windings 50 and 52 may be used to mount inductor 54 to the PCB 57, such as by flat portions 50P, 52P of respective windings 50, 52. Specifically, portions 50P, 52P may be soldered underneath to PCB 57. At least part of passageway 56 is free from intervening magnetic structure between windings 50, 52; air may for example fill the space of passageway 56 and between windings 50, 52. In one embodiment, intervening magnetic structure fills no more than 50% of a cross-sectional area between windings 50, 52, and within passageway 56; by way of example, the cross-sectional area of passageway 56 may be defined by the plane of dimensions 53A (height), 53B (depth), which is perpendicular to a line 53C (separation distance) between windings 50, 52. Also shown in FIG. 4 are widths 352 and 354, legs 356 and 358, planar surfaces 360, 362, 364, 366, 368, 372, and 374.

FIG. 4 further has advantages in that one winding 50 winds around one side of core 55, while winding 52 winds around another side of core 55, as shown. Such a configuration thus provides for input on one side of inductor 54 and output on the other side with convenient mating to a board layout of PCB 57.

Figure 5:
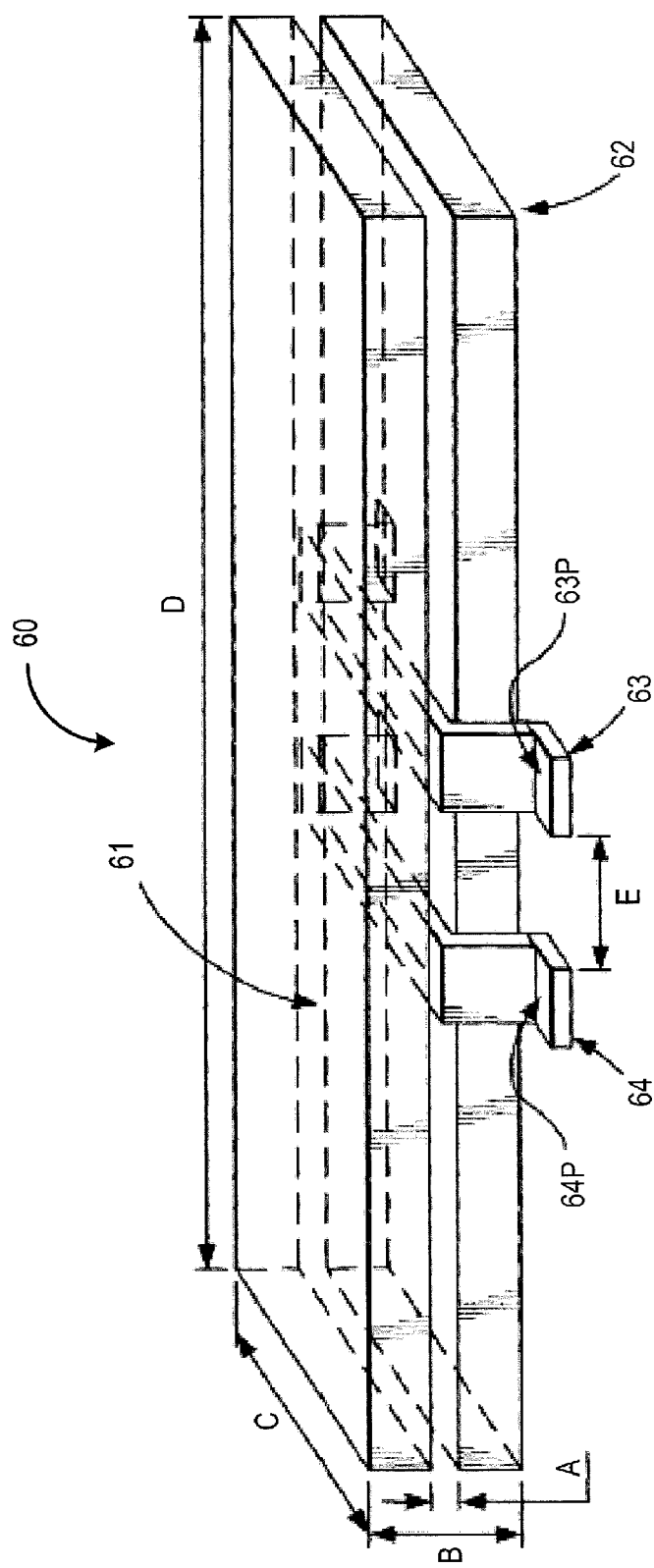
FIG. 5 shows one plate structured two-phase coupled inductor.

FIG. 5 shows a two-phase coupled inductor 60, in accord with one embodiment. Inductor 60 may, for example, serve as inductor 28 of FIG. 1. The inductor 60 may be formed from first and second magnetic cores 61 and 62, respectively. The illustration of the cores 61 and 62 is exaggerated for the purpose of showing detail of inductor 60. The two cores 61 and 62 may be "sandwiched" about the windings 64 and 63. The dimensions E, C and A, in this embodiment, are part of the calculation that determines a leakage inductance for inductor 60. The dimensions of D, C, and A, combined with the thickness of the first and second cores 61 and 62, are part of the calculation that determines a magnetizing inductance of the inductor 60. For example, assuming dimension D is much greater than E, the equations for leakage inductance and magnetizing inductance can be approximated as:

$$L_l = \frac{\mu_0 * E * C}{2 * A} \text{ and} \quad (1)$$

$$Lm = \mu_0 * D * C / (4 * A) \quad (2)$$

where $\mu_0$ is the permeability of free space, $L_l$ is leakage inductance, and $L_m$ is magnetizing inductance. One advantage of this embodiment is apparent in the ability to vary the leakage and the magnetizing inductances by varying the dimensions of inductor 60. For example, the leakage inductance and the magnetizing inductance can be controllably varied by varying the dimension E (e.g., the distance between the windings 64 and 63). In one embodiment, the cores 61 and 62 may be formed as conductive prints, or traces, directly with a PCB, thereby simplifying assembly processes of circuit construction such that windings 63, 64 are also PCB traces that couple through one or more planes of a multi-plane PCB. In one embodiment, the two-phase inductor 60 may be implemented on a PCB as two parallel thin-film magnetic cores 61 and 62. In another embodiment, inductor 60 may form planar surfaces 63P and 64P of respective windings 63, 64 to facilitate mounting of inductor 60 onto the PCB. Dimensions E, A between windings 63, 64 may define a passageway through inductor 60. At least part of this passageway is free from intervening magnetic structure between windings 63, 64; air may for example fill the space of the passageway and between windings 63, 64. In one embodiment, intervening magnetic structure fills no more than 50% of a cross-sectional area between windings 63, 64, and within the passageway; by way of example, the cross-sectional area of the passageway may be defined by the plane of dimensions A, C, which is perpendicular to a line parallel to dimension E between windings 63, 64.

Figure 6:
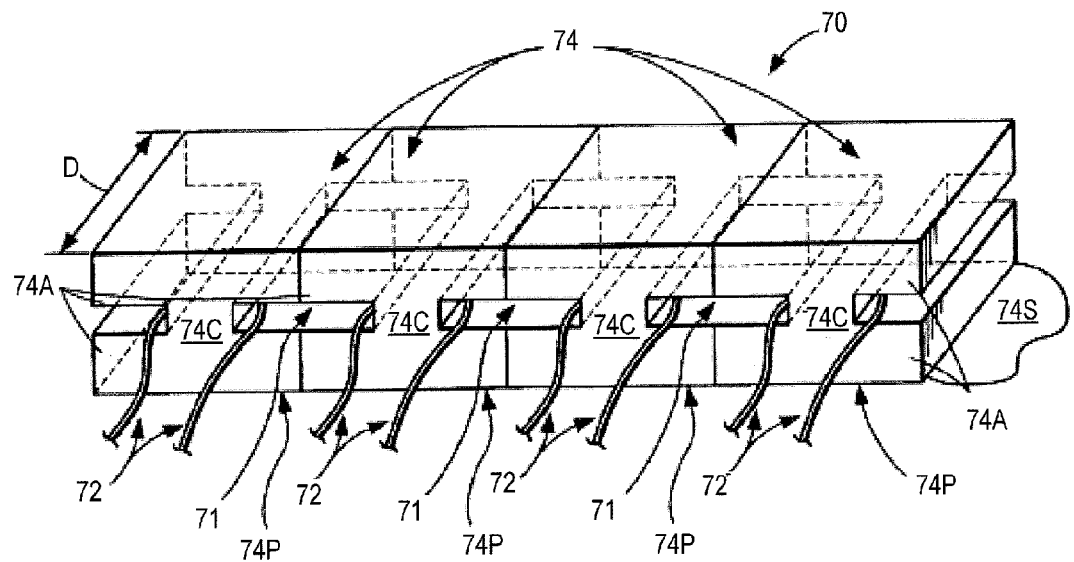
FIG. 6 shows one scalable multi-phase coupled inductor with H-shaped cores.

FIG. 6 shows a scalable, multi-phase coupled inductor 70 that may be formed from a plurality of H-shaped magnetic cores 74, in accord with one embodiment. Inductor 70 may, for example, serve as inductor 28 of FIG. 1. The inductor 70 may be formed by coupling "legs" 74A of each H-shaped core 74 together. Each core 74 has one winding 72. The windings 72 may be wound through the passageways 71 formed by legs 74A of each core 74. The winding of each core 74 may be wound prior to coupling the several cores together such that manufacturing of inductor 70 is simplified. By way of example, cores 74 may be made and used later; if a design requires additional phases, more of the cores 74 may be coupled together "as needed" without having to form additional windings 72. Each core 74 may be mounted on a PCB, such as PCB 57 of FIG. 4, and be coupled together to implement a particular design. One advantage to inductor 70 is that a plurality of cores 74 may be coupled together to make a multi-core inductor that is scalable. In one embodiment, H-shaped cores 74 cooperatively form a four-phase coupled inductor. Other embodiments may, for example, scale the number of phases of the inductor 70 by coupling more H-shaped cores 74. For example, the coupling of another H-shaped core 74 may increase the number of phases of the inductor 70 to five. In one embodiment, the center posts 74C about which the windings 72 are wound may be thinner (along direction D) than the legs 74A (along direction D). Thinner center posts 74C may reduce winding resistance and increase leakage inductance without increasing the footprint size of the coupled inductor 70. Each of the H-shaped cores 74 has a planar surface 74P, for example, that aligns with other H-shaped cores in the same plane and facilitates mounting of inductor 70 onto PCB 74S. At least part of one passageway 71, at any location along direction D within the one passageway, is free from intervening magnetic structure between windings 72; for example air may fill the three central passageways 71 of inductor 70 and between windings 72 in those three central passageways 71. In one embodiment, intervening magnetic structure fills no more than 50% of a cross-sectional area between windings 72, and within passageway 71.

Figure 7:
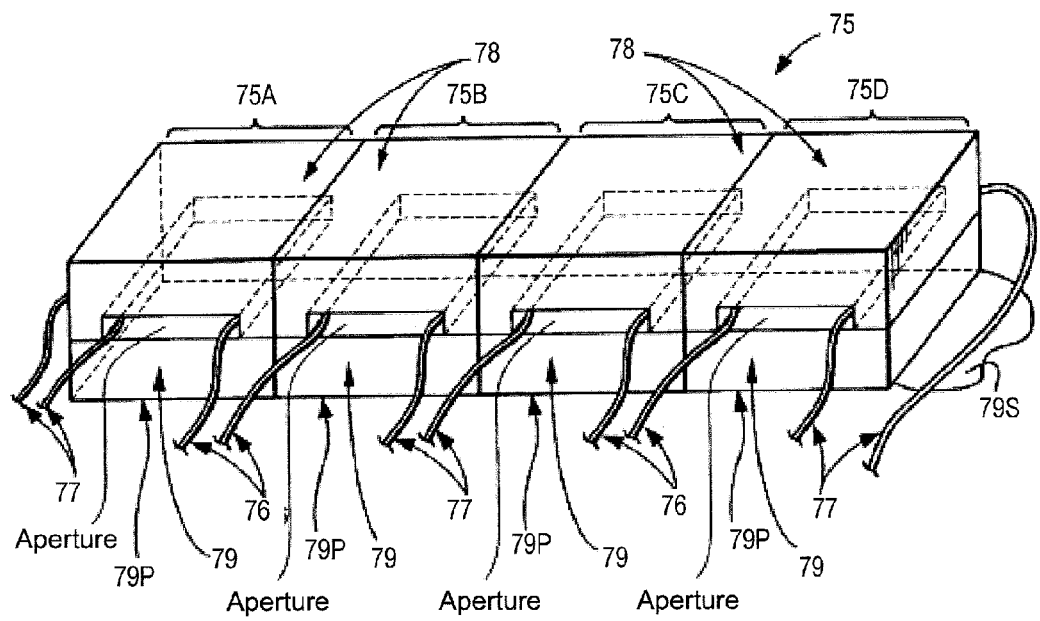
FIG. 7 shows one scalable multi-phase coupled inductor with rectangular-shaped cores.

FIG. 7 shows a scalable, multi-phase coupled inductor 75 formed from a plurality of U-shaped magnetic cores 78 and an equal number of I-shaped magnetic cores 79 (e.g., bars), in accord with one embodiment. Inductor 75 may, for example, serve as inductor 28 of FIG. 1. The U-shaped cores 78 coupled with the I-shaped cores 79 may form rectangular-shaped core cells 75A, 75B, 75C, and 75D, each of which is similar to the cell of FIG. 2, but for the winding placement. The inductor 75 may be formed by coupling each of the rectangular-shaped core cells 75A, 75B, 75C, and 75D together. The windings 76 and 77 may be wound through the passageways (labeled "APERTURE") formed by the couplings of cores 78 with cores 79 and about core elements. Similar to FIG. 6, the windings 76 and 77 of each rectangular-shaped core cell may be made prior to coupling with other rectangular-shaped core cells 75A, 75B, 75C, and 75D such that manufacturing of inductor 75 is simplified; additional inductors 75, may thus, be implemented "as needed" in a design. One advantage to inductor 75 is that cells 75A, 75B, 75C, and 75D—and/or other like cells—may be coupled together to make inductor 75 scalable. In the illustrated embodiment of FIG. 7, rectangular-shaped cells 75A, 75B, 75C, and 75D cooperatively form a five-phase coupled inductor. Each of the I-shaped cores 79 has a planar surface 79P, for example, that aligns with other I-shaped cores in the same plane and facilitates mounting of inductor 75 onto PCB 79S. At least part of the Apertures is free from intervening magnetic structure between windings 76, 77; air may for example fill the space of these passageways and between windings 76, 77. By way of example, each Aperture is shown with a pair of windings 76, 77 passing therethrough, with only air filling the space between the windings 76, 77. In one embodiment, intervening magnetic structure fills no more than 50% of a cross-sectional area between windings 76, 77, and within each respective Aperture.

Figure 8:
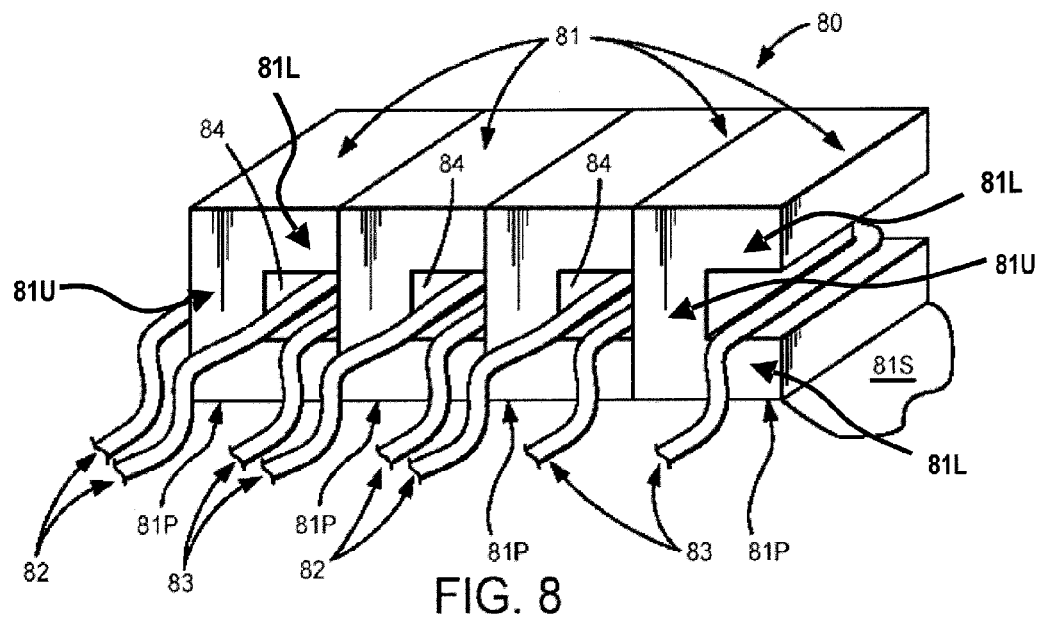
FIG. 8 shows one scalable multi-phase coupled inductor with U-shaped cores.

FIG. 8 shows a scalable, multi-phase coupled inductor 80 formed from a plurality of U-shaped magnetic cores 81 (or C-shaped depending on the orientation), in accord with one embodiment. Each magnetic core 81 has two lateral members 81L and an upright member 81U, as shown. Inductor 80 may, for example, serve as inductor 28 of FIG. 1. The inductor 80 may be formed by coupling lateral members 81L of each U-shaped core 81 (except for the last core 81 in a row) together with the upright member 81U of a succeeding U-shaped core 81, as shown. The windings 82 and 83 may be wound through the passageways 84 formed between each pair of cores 81. Scalability and ease of manufacturing advantages are similar to those previously mentioned. For example, winding 82 and its respective core 81 may be identical to winding 83 and its respective core 81, forming a pair of like cells. More cells can be added to desired scalability. Each of the U-shaped cores 81 has a planar surface 81P, for example, that aligns with other U-shaped cores 81 in the same plane and facilitates mounting of inductor 80 onto PCB 81S. At least part of one passageway 84 is free from intervening magnetic structure between windings 82, 83; air may for example fill the space of this passageway 84 and between windings 82, 83. By way of example, three passageways 84 are shown each with a pair of windings 82, 83 passing therethrough, with only air filling the space between the windings 82, 83. One winding 82 is at the end of inductor 80 and does not pass through such a passageway 84; and another winding 83 is at another end of inductor 80 and does not pass through such a passageway 84. In one embodiment, intervening magnetic structure fills no more than 50% of a cross-sectional area between windings 82, 83, and within passageway 84.

Figure 9:
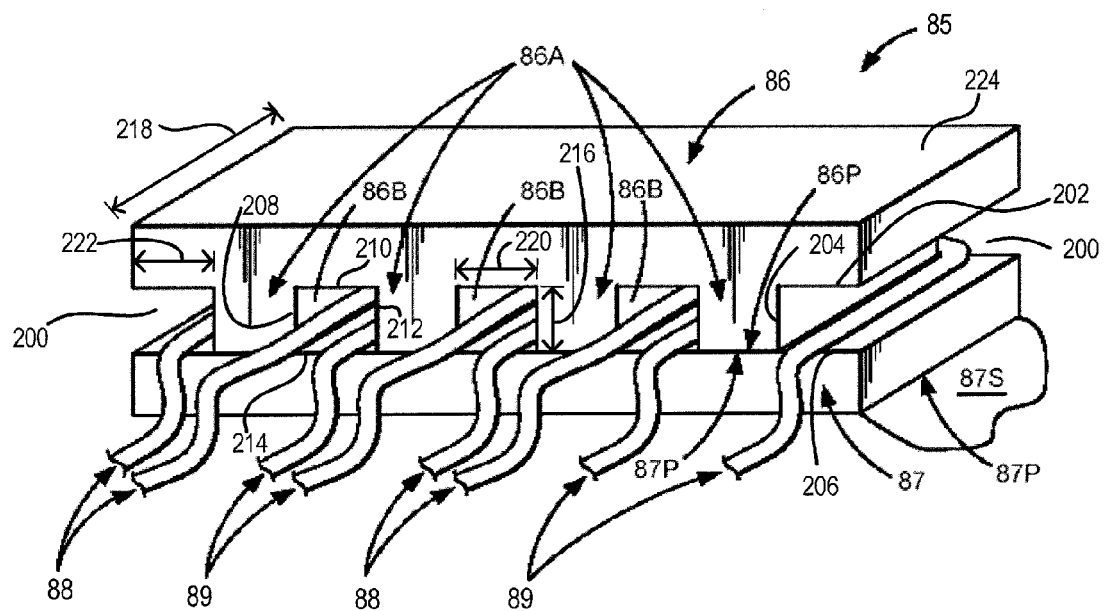
FIG. 9 shows one integrated multi-phase coupled inductor with a comb-shaped core.

FIG. 9 shows a multi-phase coupled inductor 85 formed from a comb-shaped magnetic core 86 and an I-shaped (e.g., a bar) magnetic core 87, in accord with one embodiment. Inductor 85 may, for example, serve as inductor 28 of FIG. 1. The inductor 85 may be formed by coupling a planar surface 86P of "teeth" 86A of the comb-shaped core 86 to a planar surface 87P of the I-shaped core 87 in substantially the same plane. The windings 88 and 89 may be wound through the passageways 86B formed by adjacent teeth 86A of comb-shaped core 86 as coupled with I-shaped core 87. The windings 88 and 89 may be wound about the teeth 86A of the comb-shaped core 86. FIG. 9 also shows end passageways 200, planar surfaces 202, 204, 206, 208, 210, 212, 214, and 224, height 216, depth 218, and widths 220 and 222. This embodiment may also be scalable by coupling inductor 85 with other inductor structures shown herein. For example, the U-shaped magnetic cores 81 of FIG. 8 may be coupled to inductor 85 to form a multi-phase inductor, or an N+1 phase inductor. The I-shaped core 87 has a planar surface 87P, for example, that facilitates mounting of inductor 85 onto PCB 87S. At least part of one passageway 86B is free from intervening magnetic structure between windings 88, 89; air may for example fill the space of this passageway 86B and between windings 88, 89. By way of example, three passageways 86B are shown each with a pair of windings 88, 89 passing therethrough, with only air filling the space between the windings 88, 89. One winding 88 is at the end of inductor 85 and does not pass through such a passageway 86B; and another winding 89 is at another end of inductor 85 and does not pass through such a passageway 86B. In one embodiment, intervening magnetic structure fills no more than 50% of a cross-sectional area between windings 88, 89, and within passageway 86B.

In one embodiment, windings 88, 89 wind around teeth 86A of core 86, rather than around I-shaped core 87 or the non-teeth portion of core 86.

Figure 10:
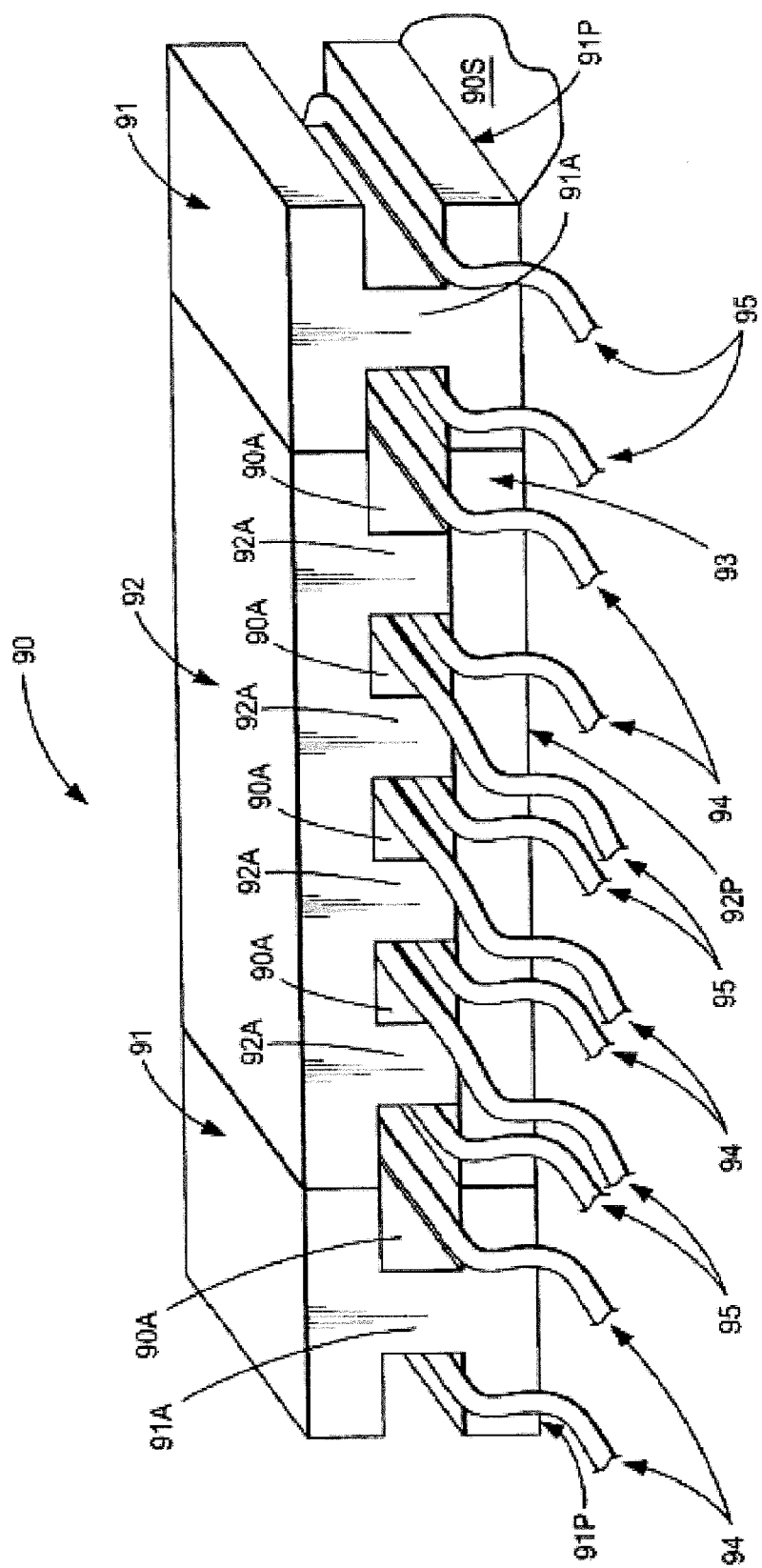
FIG. 10 shows one scalable multi-phase coupled inductor with combinations of shaped cores.

FIG. 10 shows a scalable, multi-phase coupled inductor 90 that may be formed from a comb-shaped magnetic core 92 and an I-shaped (e.g., a bar) magnetic core 93, in accord with one embodiment. Inductor 90 may, for example, serve as inductor 28 of FIG. 1. The inductor 90 may be formed by coupling "teeth" 92A of the comb-shaped core 92 to the I-shaped core 93, similar to FIG. 8. The inductor 90 may be scaled to include more phases by the addition of the one more core cells to form a scalable structure. In one embodiment, H-shaped cores 91 (such as those shown in FIG. 6 as H-shaped magnetic cores 74), may be coupled to cores 92 and 93, as shown. The windings 94 and 95 may be wound through the passageways 90A formed by the teeth 92A as coupled with I-shaped core 93. The windings 94 and 95 may be wound about the teeth 92A of core 92 and the "bars" 91A of H-shaped cores 91. Scalability and ease of manufacturing advantages are similar to those previously mentioned. Those skilled in the art should appreciate that other shapes, such as the U-shaped cores and rectangular shaped cores, may be formed similarly to cores 92 and 93. Each of the I-shaped core 93 and the H-shaped cores 91 has a respective planar surface 92P and 91P, for example, that aligns in the same plane and facilitates mounting of inductor 90 onto PCB 90S. At least part of one passageway 90A is free from intervening magnetic structure between windings 94, 95; air may for example fill the space of this passageway 90A and between windings 94, 95. By way of example, five passageways 90A are shown each with a pair of windings 94, 95 passing therethrough, with only air filling the space between the windings 94, 95. One winding 94 is at the end of inductor 90 and does not pass through such a passageway 90A; and another winding 95 is at another end of inductor 90 and does not pass through such a passageway 90A. In one embodiment, intervening magnetic structure fills no more than 50% of a cross-sectional area between windings 94, 95, and within passageway 90A.

Figure 11:
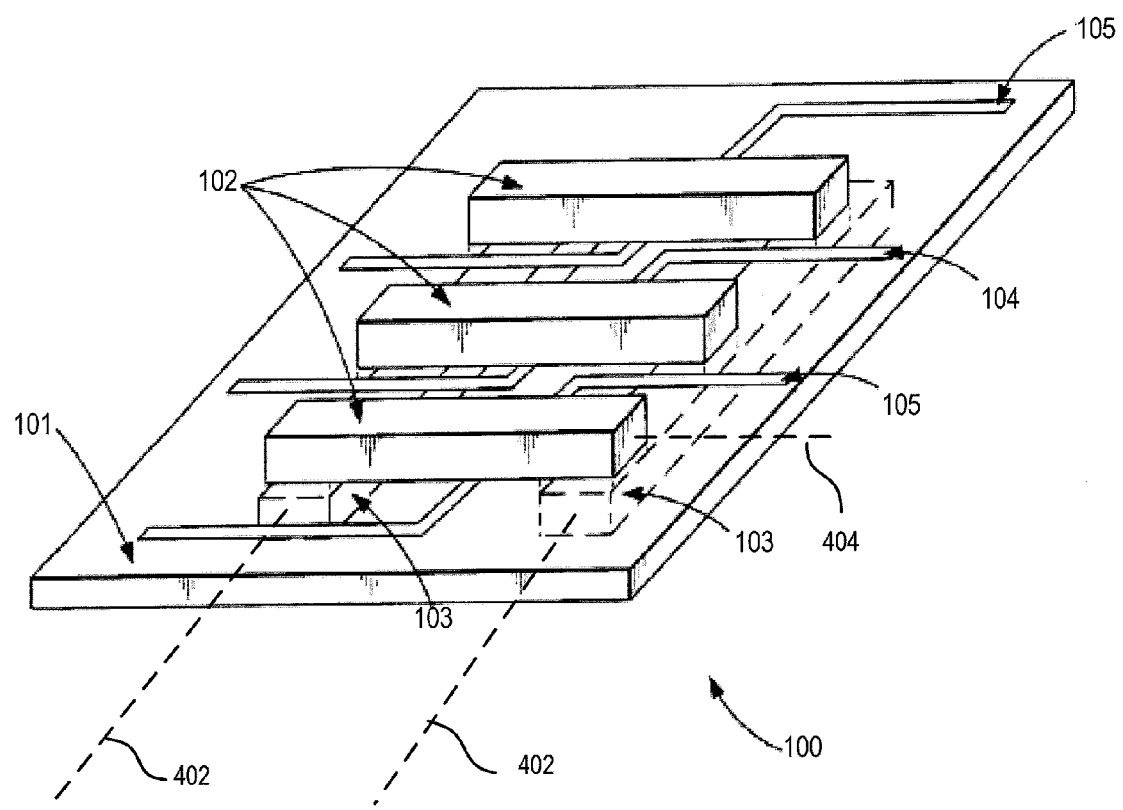
FIG. 11 shows one scalable multi-phase coupled inductor with "staple" cores.
Figure 12:
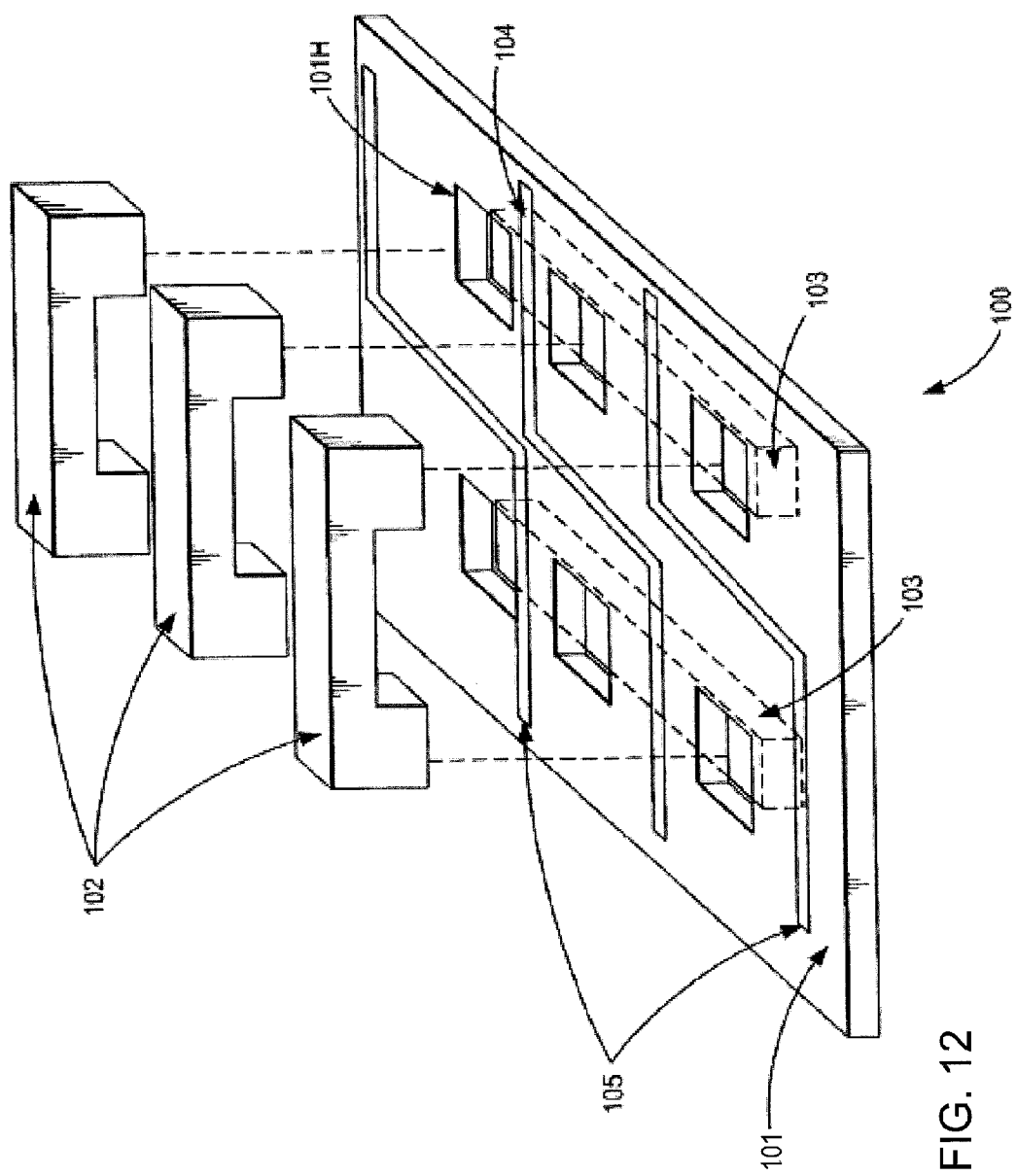
FIG. 12 shows an assembly view of the coupled inductor of FIG. 11.
Figure 13:
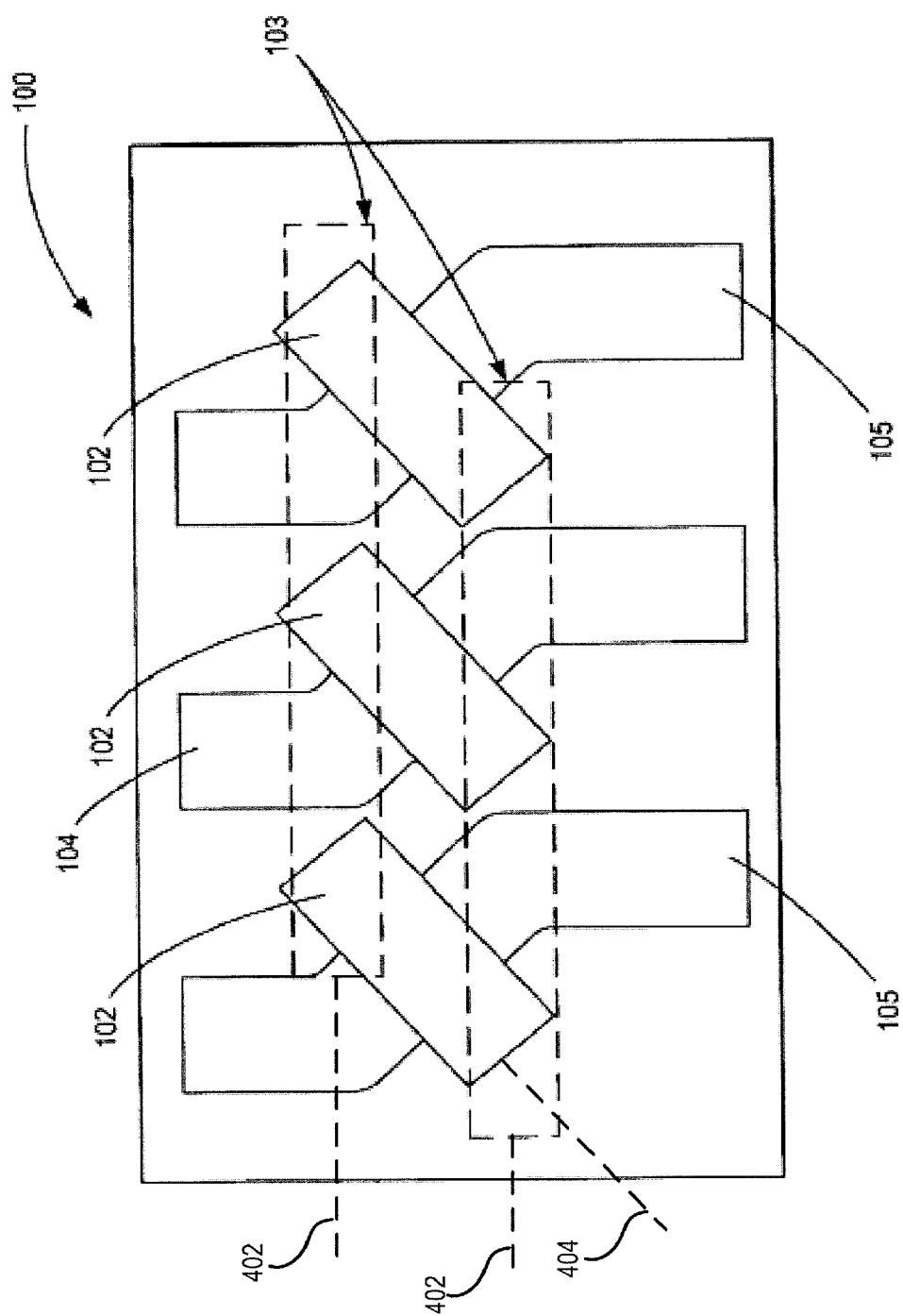
FIG. 13 shows a surface view of the inductor of FIG. 11.

FIGS. 11-13 show staple magnetic cores 102 that may serve to implement a scalable multi-phase coupled inductor 100. Inductor 100 may, for example, serve as inductor 28 of FIG. 1. The staple magnetic cores 102 are, for example, U-shaped and may function similar to a "staple". The staple magnetic cores 102 may connect, or staple, through PCB 101 to bus bars 103 to form a plurality of magnetic core cells. For example, the two bus bars 103 may be affixed to one side of PCB 101 such that the staple magnetic cores 102 traverse through the PCB 101 from the opposite side of the PCB (e.g., via apertures 101H) to physically couple to the bus bars 103. One staple magnetic core may implement a single phase for the inductor 100; thus the inductor 100 may be scalable by adding more of staple magnetic cores 102 and windings 104, 105. For example, a two-phase coupled inductor would have two staple magnetic cores 102 coupled to bus bars 103 with each core having a winding, such as windings 104, 105; the number of phases are thus equal to the number of staple magnetic cores 102 and windings 104, 105. By way of example, inductor 100, FIG. 11, shows a 3-phase inductor. Bus bars 103 may have center axes 402 and staple magnetic cores 102 may have center axes 404.

Advantages of this embodiment provide a PCB structure that may be designed in layout. As such, PCB real estate determinations may be made with fewer restrictions, as the inductor 100 becomes part of the PCB design. Other advantages of the embodiment are apparent in FIG. 13. There, it can be seen that the staples 102 may connect to PCB 101 at angles to each PCB trace (i.e., windings 104 and 105) so as to not incur added resistance while at the same time improving adjustability of leakage inductance. For example, extreme angles, such as 90 degrees, may increase the overall length of a PCB trace, which in turn increases resistance due to greater current travel. Further advantages of this embodiment include the reduction or avoidance of solder joints, which can significantly diminish high current. Additionally, the embodiment may incur fewer or no additional winding costs as the windings are part of the PCB; this may improve dimensional control so as to provide consistent characteristics such as AC resistance and leakage inductance.

Figure 14:
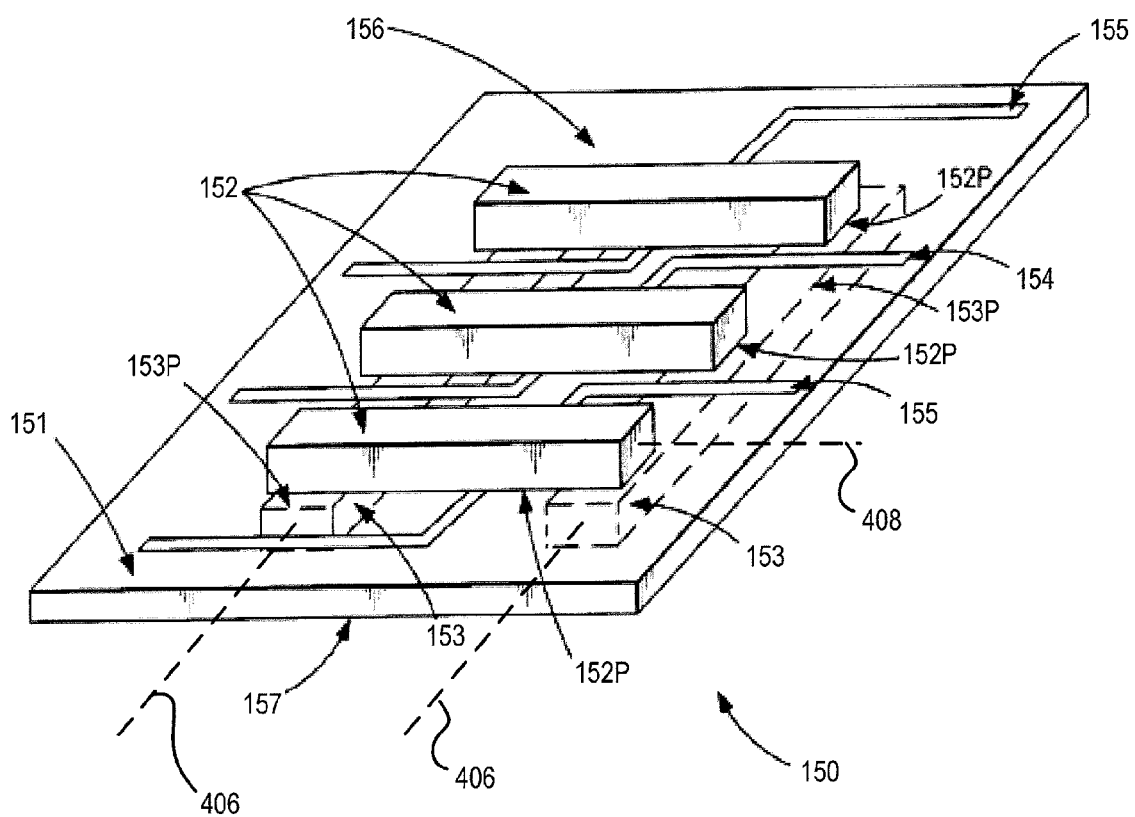
FIG. 14 shows one scaleable coupled inductor with bar magnet cores.

Similar to coupled inductor 100, FIG. 14 shows bar magnetic cores 152, 153 that serve to implement a scalable coupled inductor 150. Inductor 150 may, for example, serve as inductor 28 of FIG. 1. The bar magnetic cores 152, 153 are, for example, respectively mounted to opposing sides 156, 157 of PCB 151. Each of the bar magnetic cores 152, 153 has, for example, a respective planar surface 152P, 153P that facilitates mounting of the bar magnetic cores to PCB 151. The bar magnetic cores 152, 153, in this embodiment, do not physically connect to each other but rather affix to the sides of 156, 157 such that coupling of the inductor 150 is weaker. The coupling of the inductor 150 may, thus, be determinant upon the thickness of the PCB 151; this thickness forms a gap between cores 152 and 153. One example of a PCB that would be useful in such an implementation is a thin polyimide PCB. One bar magnetic core 152 or 153 may implement a single phase for the inductor 150; and inductor 150 may be scalable by adding additional bar magnetic cores 152 or 153. For example, a two-phase coupled inductor has two bar magnetic cores 152 coupled to two bus bars 153, each core having a winding 154 or 155 respectively. The number of phases is therefore equal to the number of bar magnetic cores 152, 153 and windings 154, 155. One advantage of the embodiment of FIG. 14 is that no through-holes are required in PCB 151. The gap between cores 152 and 153 slightly reduces coupling so as to make the DC-to-DC converter system using coupled inductor 150 more tolerant to DC current mismatch. Another advantage is that all the cores 152, 153 are simple, inexpensive I-shaped magnetic bars. Cores 152 may have center axes 408, and cores 153 may have center axes 406.

Figure 15:
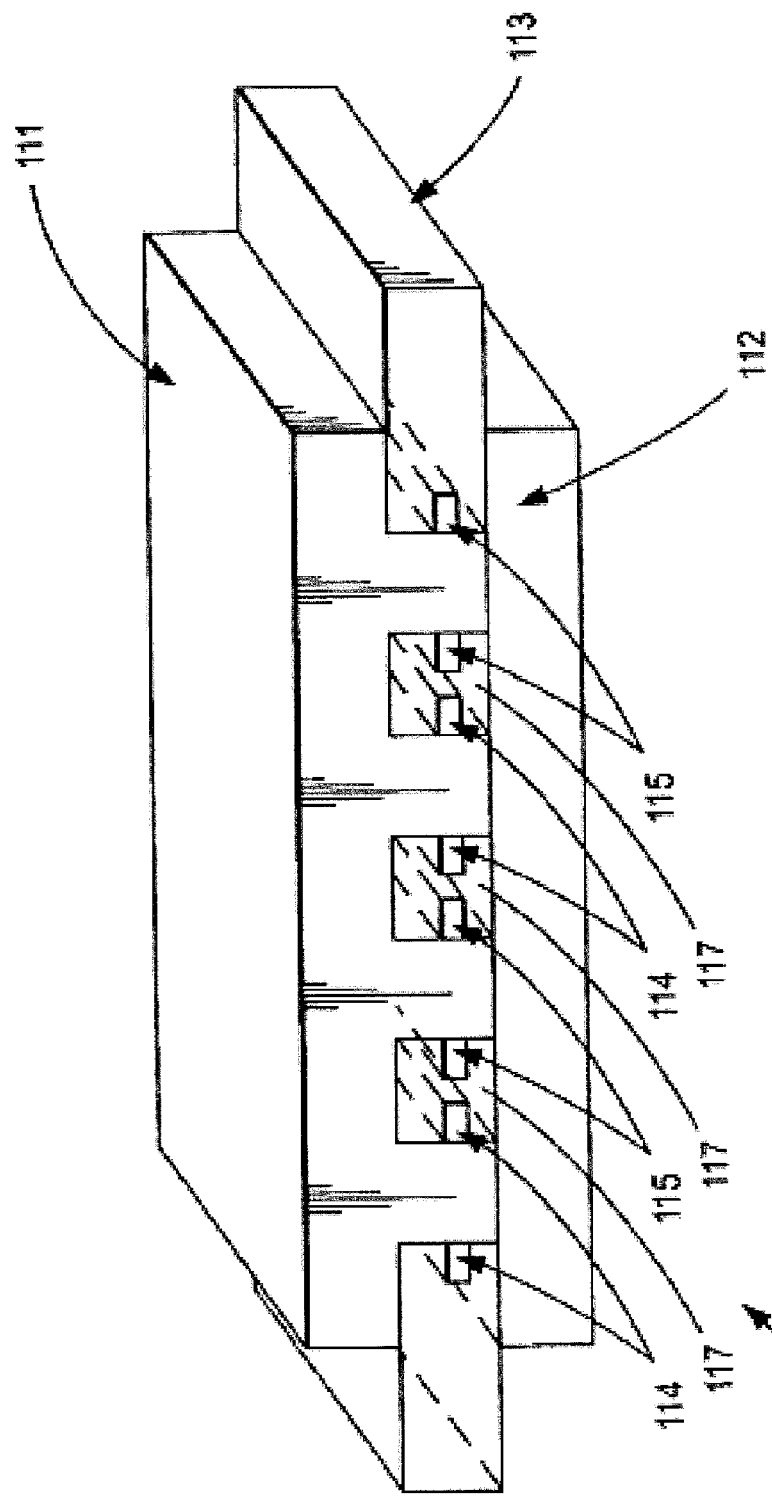
FIG. 15 shows one multi-phase coupled inductor with through-board integration.
Figure 16:
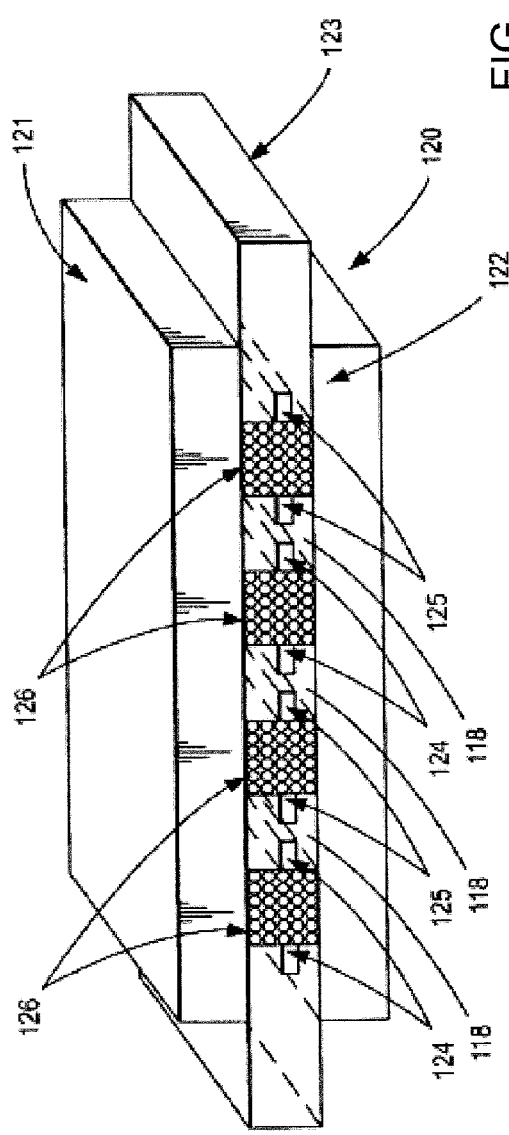
FIG. 16 shows another multi-phase coupled inductor with through-board integration.

FIGS. 15-16 each show a multi-phase coupled inductor (e.g., 110 and 120, respectively) with through-board integration, in accord with other embodiments. FIG. 15 shows a coupled inductor 110 that may be formed from a comb-shaped core 111 coupled to an I-shaped core 112 (e.g., a bar), similar to that shown in FIG. 9. In this embodiment, the cores 111 and 112 may be coupled through PCB 113 and are integrated with PCB 113. The windings 114, 115 may be formed in PCB 113 and/or as printed circuit traces on PCB 113, or as wires connected thereto.

In FIG. 15, comb-shaped core 111 and I-shaped core 112 form a series of passageways 117 within coupled inductor 110. At least part of one passageway 117 is free from intervening structure between windings 114, 115; air may for example fill the space of this passageway 117 and between windings 114, 115. By way of example, three passageways 117 are shown each with a pair of windings 114, 115 passing therethrough, with non-magnetic structure of PCB 113 filling some or all of the space between the windings 114, 115. One winding 114 is at the end of inductor 110 and does not pass through such a passageway 117; and another winding 115 is at another end of inductor 110 and does not pass through such a passageway 117. In one embodiment, intervening magnetic structure fills no more than 50% of a cross-sectional area between windings 114, 115, and within passageway 117.

FIG. 16 shows another through-board integration in a coupled inductor 120. In this embodiment, magnetic cores 121 and 122 may be coupled together by "sandwiching" the cores 121, 122 about PCB 123. The connections to the cores 121, 122 may be implemented via holes 126 in the PCB 123. The holes 126 may be filled with a ferromagnetic powder and/or bar that couples the two cores together, when sandwiched with the PCB 123. Similarly, the windings 124, 125 may be formed in PCB 123 and/or as printed circuit traces on PCB 123, or as wires connected thereto. Inductors 110 and 120 may, for example, serve as inductor 28 of FIG. 1. In this embodiment, the windings 124 and 125 are illustrated as PCB traces located within a center, or interior, plane of the PCB 123. Those skilled in the art should readily appreciate that the windings 114 and 115 may be embedded into any layer of the PCB and/or in multiple layers of the PCB, such as exterior and/or interior layers of the PCB.

In FIG. 16, cores 121 and 122 and ferromagnetic-filled holes 126 form a series of passageways 118 within coupled inductor 120. At least part of one passageway 118 is free from intervening structure between windings 124, 125; air may for example fill the space of this passageway 118 and between windings 124, 125. By way of example, three passageways 118 are shown each with a pair of windings 124, 125 passing therethrough, with non-magnetic structure of PCB 123 filling some or all of the space between the windings 124, 125. One winding 124 is at the end of inductor 120 and does not pass through such a passageway 118; and another winding 125 is at another end of inductor 120 and does not pass through such a passageway 118. In one embodiment, intervening magnetic structure fills no more than 50% of a cross-sectional area between windings 124, 125, and within passageway 118.

Figure 17:
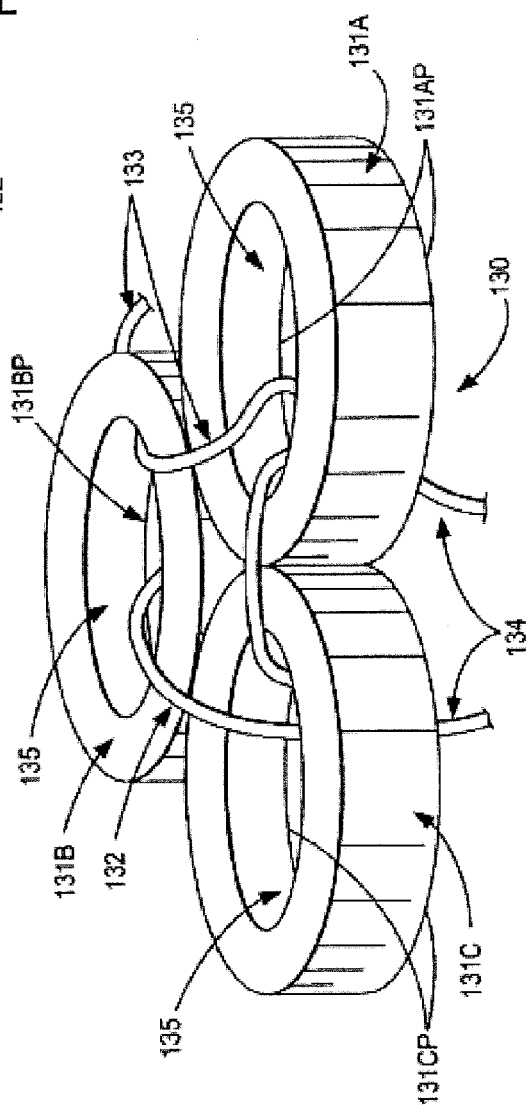
FIG. 17 shows one scalable multi-phase coupled ring-core inductor.

FIG. 17 shows a multi-phase scalable coupled ring-core inductor 130, in accord with one embodiment. The inductor 130 may be formed from multiple ring magnetic cores 131A, 131B, and 131C. In this embodiment, cores 131A, 131B, and 131C may be coupled to one another. The ring magnetic cores 131A, 131B, and 131C may have respective planar surfaces 131AP, 131BP, and 131CP, for example, that align in the same plane, to facilitate mounting with electronics such as a PCB. Each core may have a passageway 135 through which windings 132, 133, and 134 may be wound. As one example, cores 131A and 131B may be coupled to one another as winding 133 may be wound through the passageways and about the cores. Similarly, cores 131B and 131C may be coupled to one another as winding 132 may be wound through the passageways 135 of those two cores. Cores 131C and 131A may be coupled to one another as winding 134 is wound through the passageways of those two cores. In another embodiment, the multiple ring magnetic cores 131A, 131B, and 131C may be coupled together by windings such that inductor 130 appears as a string or a chain. In one embodiment, intervening magnetic structure fills no more than 50% of a cross-sectional area between the windings within each respective passageway 135.

Figure 18:
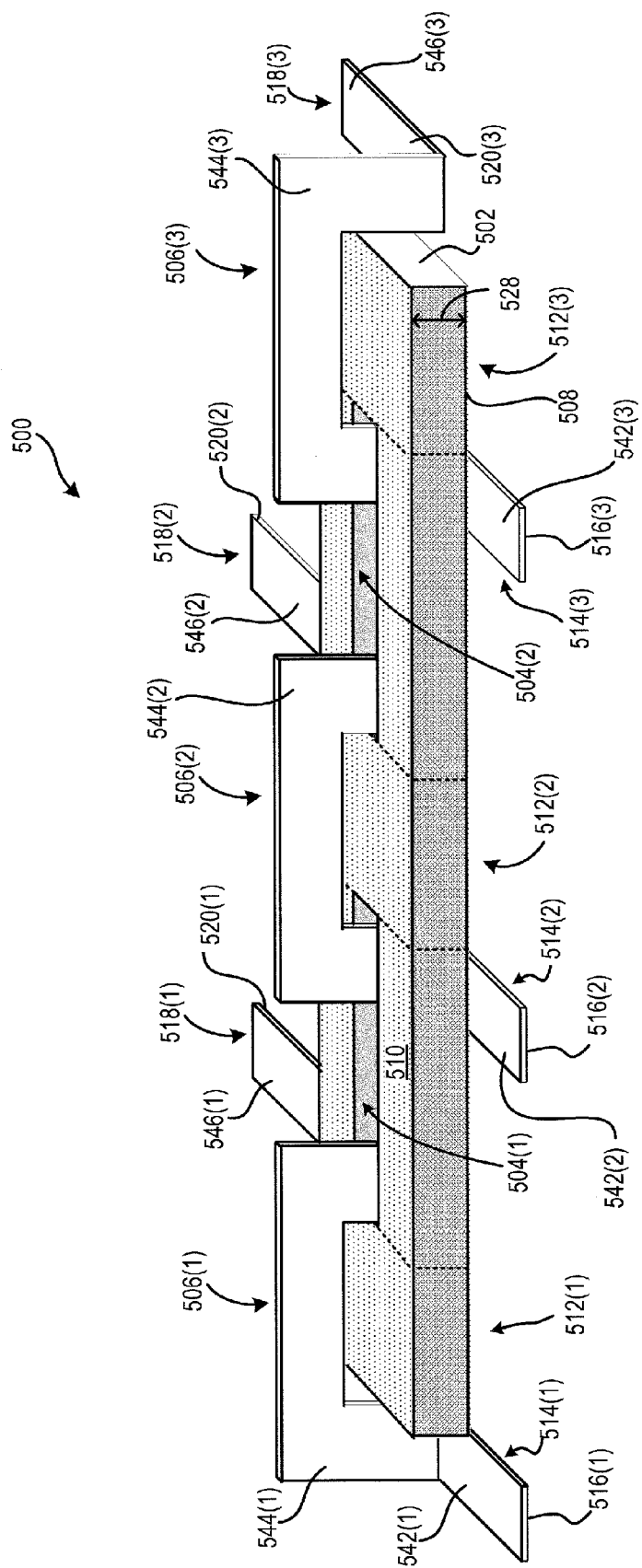
FIG. 18 is a side perspective view of one multi-phase coupled inductor, according to one embodiment.
Figure 19:
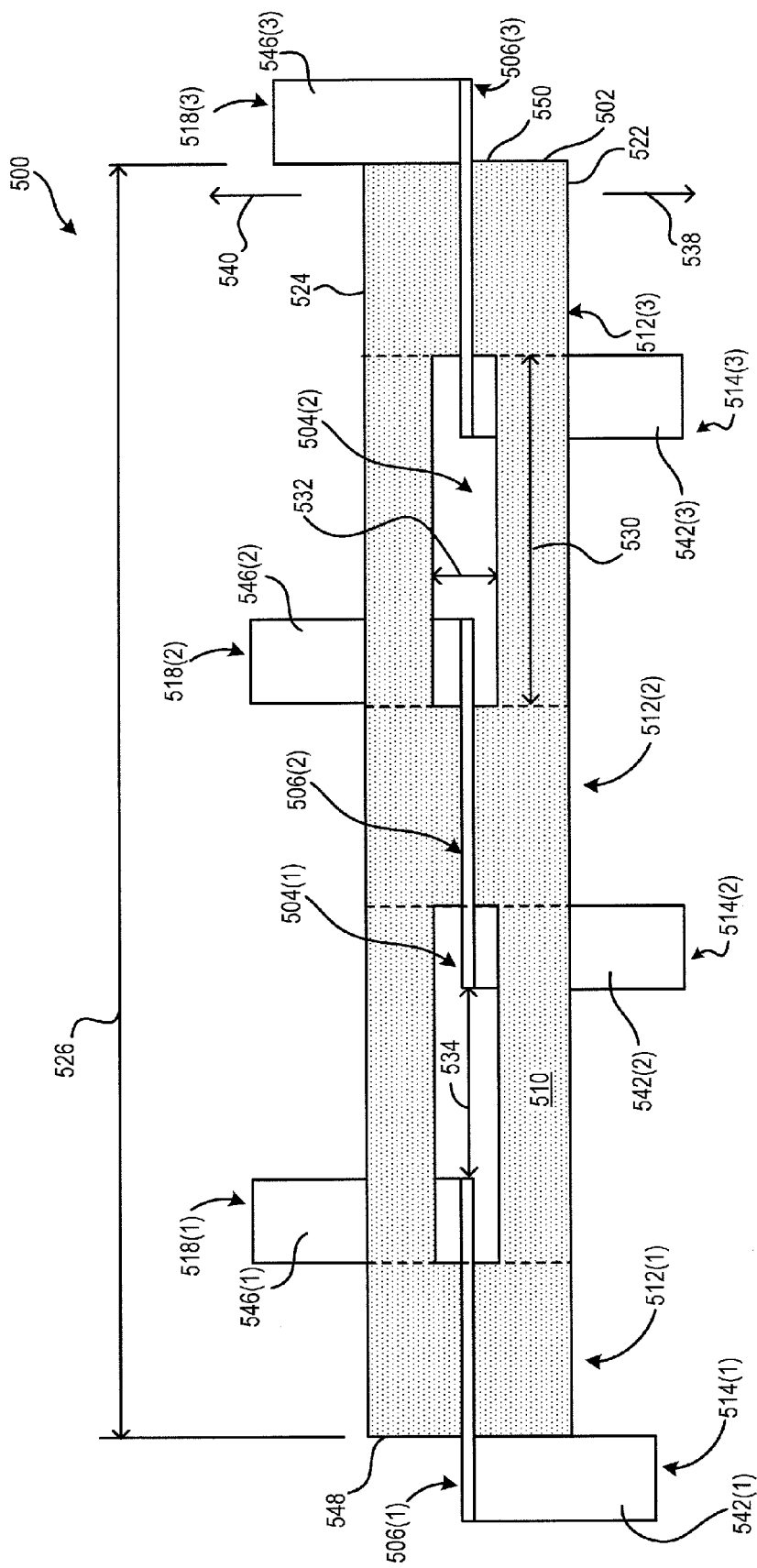
FIG. 19 is a top plan view of the multi-phase coupled inductor of FIG. 18.

FIG. 18 is a side perspective view and FIG. 19 is a top plan view of one multi-phase coupled inductor 500. Inductor 500 may, for example, serve as inductor 28 of FIG. 1. Inductor 500 is illustrated as being a three phase coupled inductor; however, embodiments of inductor 500 may support N phases, wherein N is an integer greater than one.

Inductor 500 includes core 502 and N windings 506, wherein each winding may be electrically connected to a respective phase (e.g., a phase 26 of FIG. 1) of a power converter (e.g., DC-to-DC converter system 10 of FIG. 1). Core 502 may be a single piece (e.g., a block core); alternately, core 502 may be formed of two or more magnetic elements. For example, core 502 may be formed of a comb-shaped magnetic element coupled to an I-shaped magnetic element; as another example, core 502 may be formed of a plurality of C-shaped magnetic elements or H-shaped magnetic elements coupled together. Core 502 includes a bottom planar surface 508 and a top surface 510 opposite bottom planar surface 508. Core 502 has a first side 522 opposite a second side 524 and a third side 548 opposite a fourth side 550 (labeled in FIG. 19).

Core 502 forms N−1 interior passageways 504. For example, inductor 500 is illustrated in FIGS. 18 and 19 as supporting three phases; accordingly, core 502 forms two interior passageways 504(1) and 504(2). Passageways 504 extend from top surface 510 to bottom planar surface 508. Core 502 further defines N legs 512. In FIGS. 18 and 19, legs 512(1), 512(2), and 512(3) are partially delineated by dashed lines, which are included for illustrative purposes and do not necessarily denote discontinuities in core 502. Each passageway 504 is at least partially defined by two of the N legs; for example, passageway 504(1) is partially defined by legs 512(1) and 512(2).

Core 500 has a width 526 (labeled in FIG. 19) and a height 528 (labeled in FIG. 18). Height 528 is, for example, 10 millimeters or less. Passageways 504 also have height 528. Passageways 504 each have a width 530 and a depth 532 (labeled in FIG. 19). In an embodiment of inductor 500, a ratio of passageway width 530 to passageway depth 532 is at least about 5.

As stated above, inductor 500 includes N windings 506, and inductor 500 is illustrated in FIGS. 18 and 19 as supporting three phases. Accordingly, inductor 500 includes three windings 506(1), 506(2), and 506(3). N−2 of the N windings 506 are wound at least partially about a respective leg of the magnetic core and through two of the N−1 interior passageways. For example, in FIGS. 18 and 19, winding 506(2) is wound partially about leg 512(2) and through passageways 504(1) and 504(2). Two of the N windings are wound at least partially about a respective leg of magnetic core 502 and through one interior passageway 504. For example, in FIGS. 18 and 19, winding 506(1) is wound partially about leg 512(1) and through passageway 504(1), and winding 506(3) is wound partially about leg 512(3) and through passageway 504(2). Each passageway 504 has two windings 506 wound therethrough, as may be observed from FIGS. 18 and 19.

Each passageway 504 may be at least partially free of intervening magnetic structure between the two windings wound therethrough. For example, as may be best observed from FIG. 19, in the embodiment of FIGS. 18 and 19, there is no intervening magnetic structure between windings 506(1) and 506(2) in passageway 504(1), and there is no intervening magnetic structure between windings 506(2) and 506(3) in passageway 504(2).

Each of the two windings in a passageway 504 are separated by a linear separation distance 534 (labeled in FIG. 19) in a plane parallel to first side 522 and second side 524 of core 502. In an embodiment, a ratio of separation distance 534 to passageway width 530 is at least about 0.15.

Each winding 506 has two ends, wherein the winding may be electrically connected to a circuit (e.g., a power converter) at each end. Each end of a given winding extends from opposite sides of core 502. For example, one end of winding 506(2) extends from side 522 of core 502 in the direction of arrow 538 (illustrated in FIG. 19), and the other end of winding 506(2) extends from side 524 of core 502 in the direction of arrow 540 (illustrated in FIG. 19). Such configuration of inductor 500 may allow each winding 506 to connect to a respective switching node proximate to one side (e.g., side 522 or 524) of inductor 500 and each winding 506 to connect to a common output node on an opposite side (e.g., side 524 or 522) of inductor 500. Stated differently, the configuration of inductor 500 may allow all switching nodes to be disposed adjacent to one side of inductor 500 and the common output node to be disposed on the opposite side of inductor 500. For example, each winding end extending from side 522 of core 502 may connect to a respective switching node, and each winding end extending from side 524 of core 502 may connect to a common output node. Lengths of windings 506 and/or external conductors (e.g., printed circuit board traces or bus bars) may advantageously be reduced by disposing all switching nodes on one side of inductor 500 and the common output node on the opposite side of inductor 500. Reducing the length of windings 506 and/or external conductors may reduce the resistance, cost, and/or size of inductor 500 and/or an external circuit (e.g., a power converter) that inductor 500 is installed in.

In an embodiment, windings 506 have rectangular cross section as illustrated in FIGS. 18 and 19. In such embodiment, each winding 506 forms at least three planar sections 542, 544, and 546. For example, winding 506(1) forms planar sections 542(1), 544(1), and 546(1). Planar sections 542 and 546 are about parallel with each other, and planar sections 542 and 546 are about orthogonal to planar section 544. Planar sections 542 and 546 may also be about parallel to bottom planar surface 508.

In an embodiment, each winding 506 has a first end forming a first tab 514 and a second end forming a second tab 518, as illustrated in FIGS. 18 and 19. For example, winding 506(1) of FIG. 18 forms first tab 514(1) and second tab 518(1). Each first tab 514 forms a first planar surface 516 about parallel to bottom planar surface 508, and each second tab 518 forms a second planar surface 520 about parallel to bottom planar surface 508. For example, first tab 514(3) forms first planar surface 516(3) and second tab 518(3) forms second planar surface 520(3). Each first planar surface 516 and second planar surface 520 may be used to connect its respective tab to a printed circuit board disposed proximate to bottom planar surface 508. N−1 of first tabs 514 and N−1 of second tabs 518 are each partially disposed along bottom planar surface 508; for example, in FIGS. 18 and 19, first tabs 514(2) and 514(3) are partially disposed along bottom planar surface 508, and second tabs 518(1) and 518(2) are partially disposed along bottom planar surface 508.

Core 502 and each winding 506 collective form a magnetizing inductance of inductor 500 as well as a leakage inductance of each winding 506. As discussed above with respect to FIG. 1, the leakage inductance of each winding, for example, ranges from 10 nH to 200 nH. Furthermore, separation distance 534 between adjacent windings may be chosen to be sufficiently large such that the leakage inductance of each winding 506 is sufficiently large. Separation distance 534 is, for example, 1.5 millimeters or greater (e.g., 3 millimeters). In embodiments of inductor 500, the magnetizing inductance of inductor 500 is greater than the leakage inductance of each winding 506.

Figure 20:
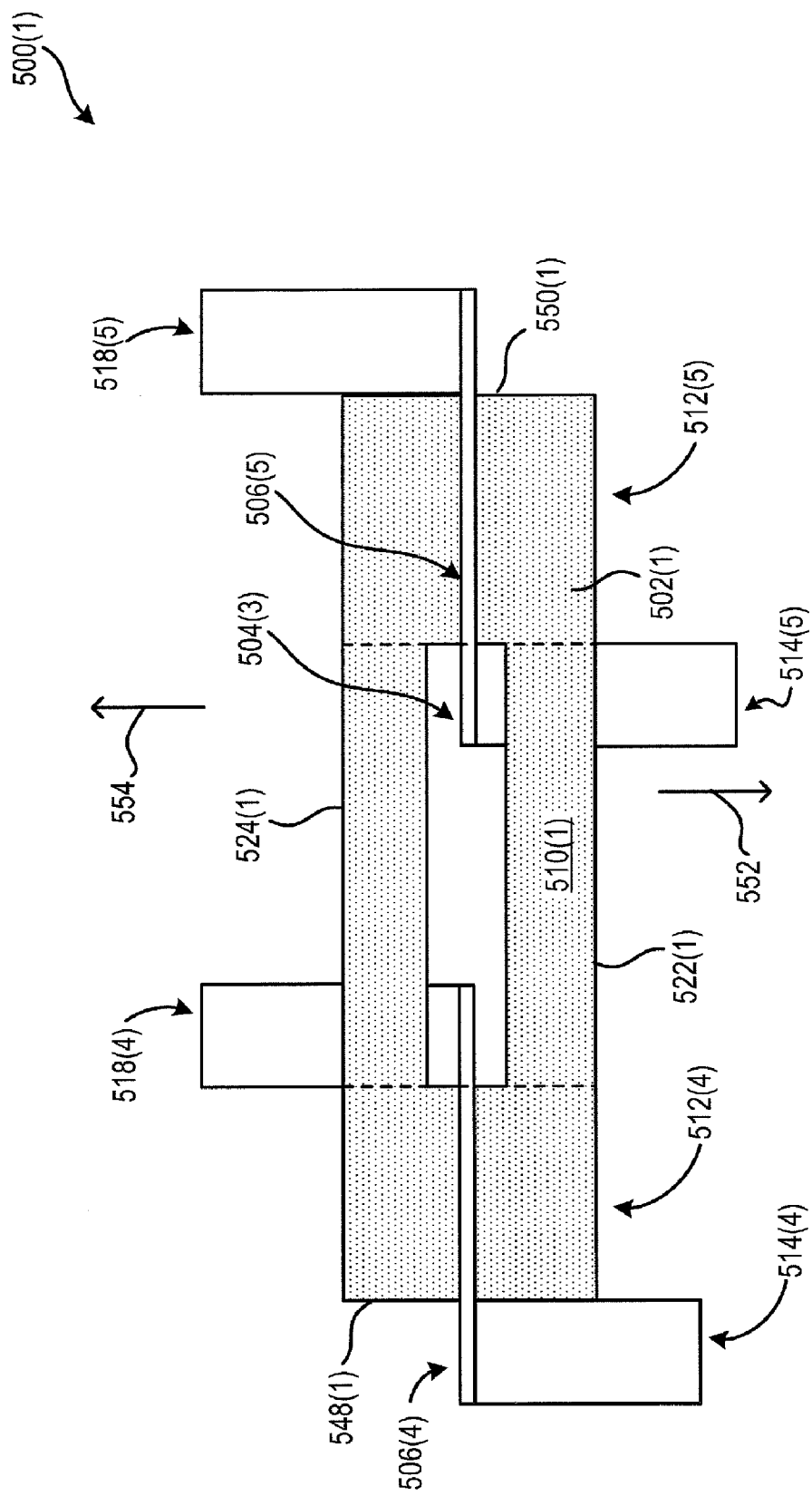
FIG. 20 is a top plan view of a two-phase embodiment of the coupled inductor of FIGS. 18 and 19.

FIG. 20 is a top plan view of a two-phase coupled inductor 500(1), which is a two-phase embodiment of inductor 500 of FIGS. 18 and 19. As illustrated in FIG. 20, core 502(1) includes legs 512(4) and 512(5). Leg 512(4) extends from first side 522(1) to second side 524(1) and defines third side 548(1); leg 512(5) extends from first side 522(1) to second side 524(1) and defines fourth side 550(1). Interior passageway 504(3) extends from a top surface 510(1) to a bottom planar surface of core 502(1) (not visible in the top plan view of FIG. 20). Winding 506(4) is wound partially about leg 512(4), through interior passageway 504(3), and along third side 548(1). Winding 506(5) is wound partially about leg 512(5), through interior passageway 504(3), and along fourth side 550(1).

Windings 506(4) and 506(5) each form a first end for connecting the winding to a respective switching node of a power converter. The first end of winding 506(4) fauns a first tab 514(4), and the first end of winding 506(5) forms a first tab 514(5). Each of first tabs 514(4) and 514(5) has a planar surface about parallel to the bottom planar surface of core 502(1) for connecting the first tab to a printed circuit board disposed proximate to the bottom planar surface of core 502(1). Each of first tabs 514(4) and 514(5) extends beyond core 502(1) from first side 522(1) of the core in the direction indicated by arrow 552.

Windings 506(4) and 506(5) each form a second end for connecting the winding to a common output node of the power converter. The second end of winding 506(4) forms a second tab 518(4), and the second end of winding 506(5) forms a second tab 518(5). Each of second tabs 518(4) and 518(5) has a planar surface about parallel to the bottom planar surface of core 502(1) for connecting the second tab to the printed circuit board disposed proximate to the bottom planar surface of core 502(1). Each of second tabs 518(4) and 518(5) extends beyond core 502(1) from second side 524(1) of the core in the direction indicated by arrow 554.

Figure 21:
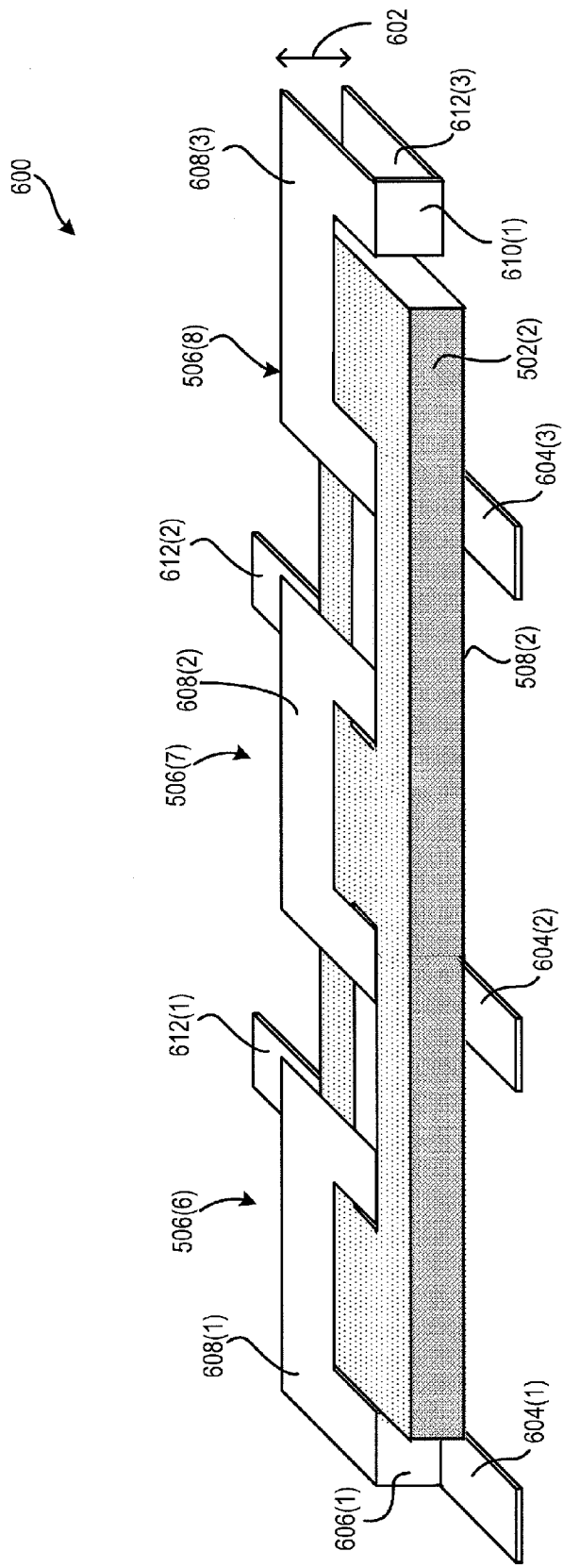
FIG. 21 is a side perspective view of one multi-phase coupled inductor, according to one embodiment.

FIG. 21 is a side perspective view of one multi-phase coupled inductor 600. Inductor 600 is essentially the same as an embodiment of inductor 500 having windings 506 with rectangular cross section with the exception that windings 506 of inductor 600 form at least five planar sections 604, 606, 608, 610, and 612. It should be noted each of the five planar sections are not visible for each winding 506 in the perspective view of FIG. 21. For example, winding 506(8) of inductor 600 forms planar sections 604(3), 608(3), 610(1), and 612(3) as well as an additional planar section that is not visible in the perspective view of FIG. 21. Such additional planar section of winding 506(8) corresponds to planar section 606(1) of winding 506(6). Planar sections 604, 608, and 612 are, for example, about parallel to a bottom planar surface 508(2) of core 502(2). Forming windings 506 with at least five planar sections may advantageously reduce a height 602 of inductor 600.

While some inductor embodiments include two-phase coupling, such as those shown in FIGS. 2-5, it is not intended that inductor coupling should be limited to two-phases. For example, a coupled inductor with two windings would function as a two-phase coupled inductor with good coupling, but coupling additional inductors together may advantageously increase the number of phases as a matter of design choice. Integration of multiple inductors that results in increased phases may achieve current ripple reduction of a power unit coupled thereto; examples of such are shown in FIGS. 6-8, 10, and 17. Coupling two or more two-phase inductor structures together to create a scalable N-phase coupled inductor may achieve an increased number of phases of an inductor. The windings of such an N-phase coupled inductor may be wound through the passageways and about the core such as those shown in FIGS. 6-8, 10, and 17.

Figure 22:
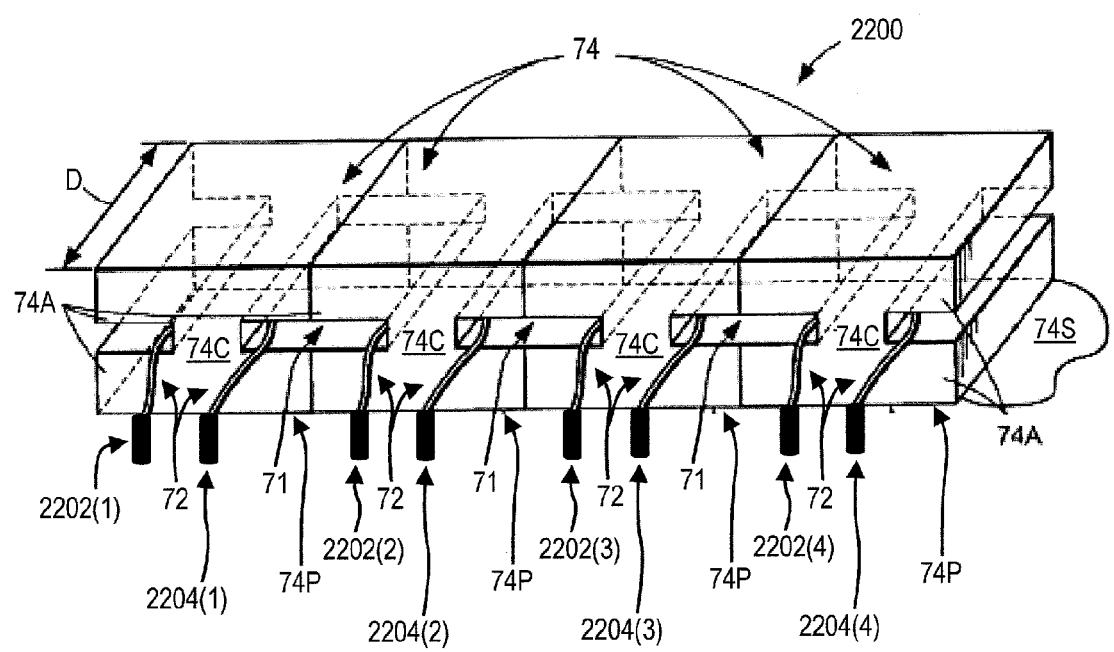
FIG. 22 shows one scalable multi-phase coupled inductor with H-shaped cores and thru-hole pins, according to an embodiment.
Figure 23:
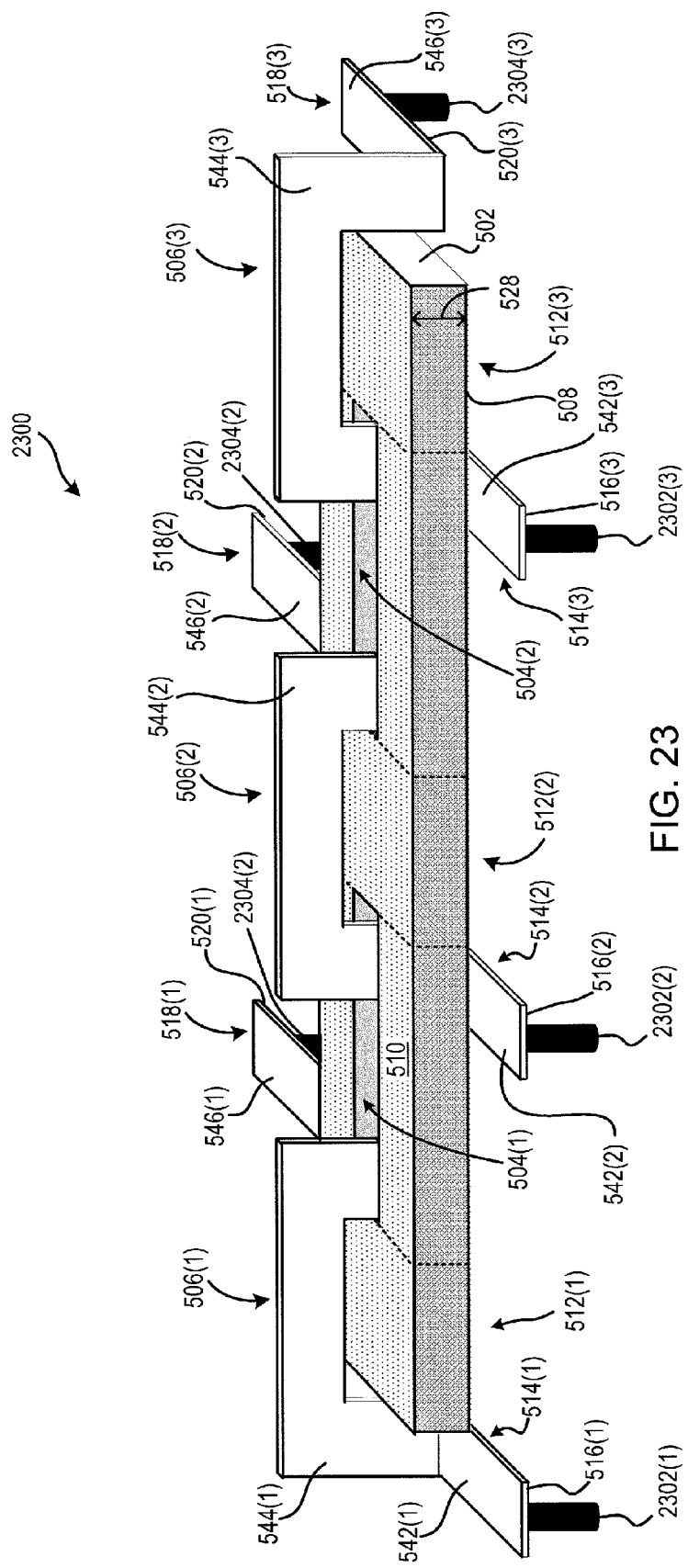
FIG. 23 is a side perspective view of one multi-phase coupled inductor with thru-hole pins, according to an embodiment.

Some embodiments of the inductors disclosed herein include solder tabs disposed on a bottom surface of the inductor's magnetic core. In such embodiments, each winding has a first end electrically coupled to a respective first solder tab disposed on the core's bottom surface, and each winding has a second end electrically coupled to a respective second solder tab disposed on the core's bottom surface. Furthermore, some embodiments of the inductors disclosed herein include thru-hole pins for connecting the inductor's windings to a printed circuit board (e.g., via solder). In such embodiments, each winding has a first end electrically coupled to a respective first thru-hole pin, and each winding has a second end electrically coupled to a respective second thru-hole pin. For example, FIG. 22 shows a coupled inductor 2200, which is similar to coupled inductor 70 (FIG. 6), but including first and second thru-hole pins 2202, 2204. As another example, FIG. 23 shows a coupled inductor 2300, which is similar to coupled inductor 500 (FIG. 18), but including first and second thru-hole pins 2302, 2304.

Since certain changes may be made in the above methods and systems without departing from the scope hereof, one intention is that all matter contained in the above description or shown in the accompanying drawings be interpreted as illustrative and not in a limiting sense. By way of example, those skilled in the art should appreciate that items as shown in the embodiments may be constructed, connected, arranged, and/or combined in other formats without departing from the scope of the invention. Another intention includes an understanding that the following claims are to cover all generic and specific features of the invention described herein, and all statements of the scope of the invention which, as a matter of language, might be said to fall there between.

What is claimed is:

1. An N-phase coupled inductor, comprising:
    a printed circuit board having a first surface opposite to a second surface;
    a magnetic core including:
        a first magnetic element disposed on the first surface of the printed circuit board,
        a second magnetic element disposed on the second surface of the printed circuit board, and
        N connecting magnetic elements, each of the N connecting magnetic elements comprising ferromagnetic powder disposed in a respective hole in the printed circuit board, N being an integer greater than one, each one of the N connecting magnetic elements connecting the first and second magnetic elements; and
    N windings disposed on the printed circuit board, each one of the N windings wound at least partially around a respective one of the N connecting magnetic elements.

2. The coupled inductor of claim 1, N being greater than two.

3. The coupled inductor of claim 1, at least one of the N windings being a printed circuit trace disposed on a surface of the printed circuit board selected from the group consisting of the first surface and the second surface.

4. The coupled inductor of claim 1, at least one of the N windings being embedded in the printed circuit board.

5. The coupled inductor of claim 1, the magnetic core forming a plurality of passageways, each one of the plurality of passageways partially defined by a respective pair of the N connecting magnetic elements, a cross-sectional area of each one of the plurality of passageways being no more than 50 percent filled with intervening magnetic structure.

* * * * *